United States Patent
Jang et al.

(10) Patent No.: US 11,638,024 B2
(45) Date of Patent: Apr. 25, 2023

(54) IMAGE ENCODING/DECODING METHOD AND APPARATUS FOR SIGNALING RESIDUAL CODING METHOD USED FOR ENCODING BLOCK TO WHICH BDPCM IS APPLIED, AND METHOD FOR TRANSMITTING BITSTREAM

(71) Applicant: LG ELECTRONICS INC., Seoul (KR)

(72) Inventors: Hyeong Moon Jang, Seoul (KR); Jungah Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/703,696

(22) Filed: Mar. 24, 2022

(65) Prior Publication Data

US 2022/0279200 A1    Sep. 1, 2022

Related U.S. Application Data

(63) Continuation of application No. PCT/KR2020/013150, filed on Sep. 25, 2020.

(60) Provisional application No. 62/905,400, filed on Sep. 25, 2019.

(51) Int. Cl.
*H04N 19/46* (2014.01)
*H04N 19/105* (2014.01)
*H04N 19/124* (2014.01)
*H04N 19/176* (2014.01)

(52) U.S. Cl.
CPC ........... *H04N 19/46* (2014.11); *H04N 19/105* (2014.11); *H04N 19/124* (2014.11); *H04N 19/176* (2014.11)

(58) Field of Classification Search
CPC .... H04N 19/46; H04N 19/105; H04N 19/124; H04N 19/176
See application file for complete search history.

(56) References Cited

U.S. PATENT DOCUMENTS

2020/0275111 A1*  8/2020  Zhao .................... H04N 19/132
2020/0413100 A1* 12/2020  Hsiang ................. H04N 19/124
(Continued)

FOREIGN PATENT DOCUMENTS

KR    20180123466 A    11/2018

OTHER PUBLICATIONS

Marta Karczewicz, et al., "CE8-related: Quantized residual BDPCM", Joint Video Experts Team (JVET) of ITU-T SG 16 WP 3 and ISO/IEC JTC 1/SC 29/WG 11,14th Meeting: Geneva, CH, Mar. 19-27, 2019. JVET-N0413.
(Continued)

*Primary Examiner* — Francis Geroleo
(74) *Attorney, Agent, or Firm* — Dentons US LLP

(57) ABSTRACT

An image encoding/decoding method and apparatus are provided. An image decoding method according to the present disclosure is performed by an image decoding apparatus. The image decoding method may comprise determining a residual coding method of a current transform block corresponding to a current coding block, reconstructing residual information of the transform block based on the determined residual coding method and reconstructing the current transform block based on the residual information.

11 Claims, 31 Drawing Sheets

(56) References Cited

U.S. PATENT DOCUMENTS

2021/0092388 A1* 3/2021 Sarwer ................... H04N 19/12
2022/0210414 A1* 6/2022 Zhang ................... H04N 19/157

OTHER PUBLICATIONS

Xin Zhao, et al., "CE7: Modified limitation on context coded bins for residual coding of Transform Skip mode (CE7-3.5 and CE7-3.6)", Joint Video Experts Team (JVET) of ITU-T SG 16 WP 3 and ISO/IEC JTC 1/SC 29/WG 11, 15th Meeting: Gothenburg, SE, Jul. 3-12, 2019. JVET-O0104-v2.

Sunmi Yoo, et al., "CE8-related : Unified condition between BDPCM and transform skip" Joint Video Experts Team (JVET) of ITU-T SG 16 WP 3 and ISO/IEC JTC 1/SC 29/WG 11, 15th Meeting: Gothenburg, SE, Jul. 3-12, 2019. JVET-O0206_v1.

Benjamin Bross, et al., "Versatile Video Coding (Draft 6)", nt Video Experts Team (JVET) of ITU-T SG 16 WP 3 and ISO/IEC JTC 1/SC 29/WG 11, 15th Meeting: Gothenburg, SE, Jul. 3-12, 2019. JVET-O2001-vE.

* cited by examiner

FIG. 4
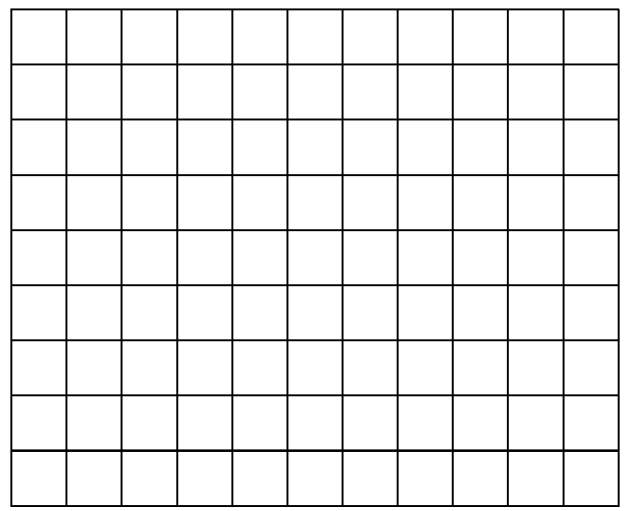
FIG. 5
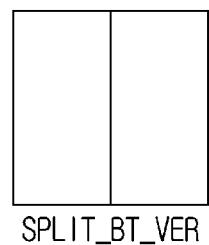 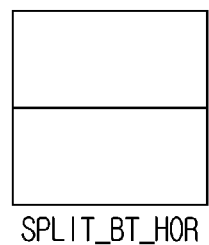 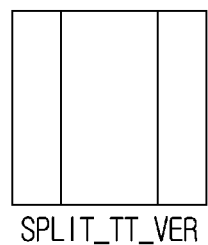 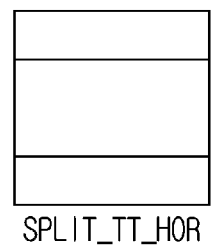
SPLIT_BT_VER   SPLIT_BT_HOR   SPLIT_TT_VER   SPLIT_TT_HOR

FIG. 21

| residual_coding( x0, y0, log2TbWidth, log2TbHeight, cIdx ) { | Descriptor |
|---|---|
|   if( ( tu_mts_idx[ x0 ][ y0 ] > 0 \|\| | |
|     ( cu_sbt_flag && log2TbWidth < 6 && log2TbHeight < 6 ) ) | |
|     && cIdx = = 0 && log2TbWidth > 4 ) | |
|     log2ZoTbWidth = 4 | |
|   else | |
|     log2ZoTbWidth = Min( log2TbWidth, 5 ) | |
|   MaxCcbs = 2 * ( 1 << log2TbWidth ) * ( 1<< log2TbHeight ) | |
|   if( tu_mts_idx[ x0 ][ y0 ] > 0 \|\| | |
|     ( cu_sbt_flag && log2TbWidth < 6 && log2TbHeight < 6 ) ) | |
|     && cIdx = = 0 && log2TbHeight > 4 ) | |
|     log2ZoTbHeight = 4 | |
|   else | |
|     log2ZoTbHeight = Min( log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2TbWidth = log2ZoTbWidth | |
|   log2TbHeight = log2ZoTbHeight | |
|   remBinsPass1 = ( ( 1 << ( log2TbWidth + log2TbHeight ) ) * 7 ) >> 2 | |
|   log2SbW = ( Min( log2TbWidth, log2TbHeight ) < 2 ? 1 : 2 ) | |
|   log2SbH = log2SbW | |

FIG. 22

| | |
|---|---|
| if( log2TbWidth + log2TbHeight > 3 ) { | |
|   if( log2TbWidth < 2 ) { | |
|     log2SbW = log2TbWidth | |
|     log2SbH = 4 − log2SbW | |
|   } else if( log2TbHeight < 2 ) { | |
|     log2SbH = log2TbHeight | |
|     log2SbW = 4 − log2SbH | |
|   } | |
| } | |
| numSbCoeff = 1 << ( log2SbW + log2SbH ) | |
| lastScanPos = numSbCoeff | |
| lastSubBlock = ( 1 << ( log2TbWidth + log2TbHeight − ( log2SbW + log2SbH ) ) ) − 1 | |
| do { | |
|   if( lastScanPos == 0 ) { | |
|     lastScanPos = numSbCoeff | |
|     lastSubBlock− − | |
|   } | |
|   lastScanPos− − | |
|   xS = DiagScanOrder[ log2TbWidth − log2SbW ][ log2TbHeight − log2SbH ]<br>        [ lastSubBlock ][ 0 ] | |
|   yS = DiagScanOrder[ log2TbWidth − log2SbW ][ log2TbHeight − log2SbH ]<br>        [ lastSubBlock ][ 1 ] | |
|   xC = ( xS << log2SbW ) + DiagScanOrder[ log2SbW ][ log2SbH ][ lastScanPos ][ 0 ] | |
|   yC = ( yS << log2SbH ) + DiagScanOrder[ log2SbW ][ log2SbH ][ lastScanPos ][ 1 ] | |
| } while( ( xC != LastSignificantCoeffX ) \|\| ( yC != LastSignificantCoeffY ) ) | |

FIG. 23

| | |
|---|---|
| if( lastSubBlock = = 0 && log2TbWidth >= 2 && log2TbHeight >= 2 && !transform_skip_flag[ x0 ][ y0 ] && lastScanPos > 0 ) | |
|   LfnstDcOnly = 0 | |
| if( ( lastSubBlock > 0 && log2TbWidth >= 2 && log2TbHeight >= 2 ) \|\| ( lastScanPos > 7 && ( log2TbWidth = = 2 \|\| log2TbWidth = = 3 ) && log2TbWidth = = log2TbHeight ) ) | |
|   LfnstZeroOutSigCoeffFlag = 0 | |
| QState = 0 | |
| for( i = lastSubBlock; i >= 0; i− − ) { | |
|   startQStateSb = QState | |
|   xS = DiagScanOrder[ log2TbWidth − log2SbW ][ log2TbHeight − log2SbH ] [ i ][ 0 ] | |
|   yS = DiagScanOrder[ log2TbWidth − log2SbW ][ log2TbHeight − log2SbH ] [ i ][ 1 ] | |
|   inferSbDcSigCoeffFlag = 0 | |
|   if( ( i < lastSubBlock ) && ( i > 0 ) ) { | |
|     coded_sub_block_flag[ xS ][ yS ] | ae(v) |
|     inferSbDcSigCoeffFlag = 1 | |
|   } | |

FIG. 24

| | |
|---|---|
| firstSigScanPosSb = numSbCoeff | |
| lastSigScanPosSb = −1 | |
| firstPosMode0 = ( i = = lastSubBlock ? lastScanPos : numSbCoeff − 1 ) | |
| firstPosMode1 = −1 | |
| for( n = firstPosMode0; n >= 0 && remBinsPass1 >= 4; n− − ) { | |
|   xC = ( xS << log2SbW ) + DiagScanOrder[ log2SbW ][ log2SbH ][ n ][ 0 ] | |
|   yC = ( yS << log2SbH ) + DiagScanOrder[ log2SbW ][ log2SbH ][ n ][ 1 ] | |
|   if( coded_sub_block_flag[ xS ][ yS ] && ( n > 0 \|\| !inferSbDcSigCoeffFlag ) && ( xC != LastSignificantCoeffX \|\| yC != Last SignificantCoeffY ) ) { | |
|     sig_coeff_flag[ xC ][ yC ] | ae(v) |
|     remBinsPass1− − | |
|     if( sig_coeff_flag[ xC ][ yC ] ) | |
|       inferSbDcSigCoeffFlag = 0 | |
|   } | |

FIG. 25

| | |
|---|---|
| if( sig_coeff_flag[ xC ][ yC ] ) { | |
|   abs_level_gtx_flag[ n ][ 0 ] | ae(v) |
|   remBinsPass1- - | |
|   if( abs_level_gtx_flag[ n ][ 0 ] ) { | |
|     par_level_flag[ n ] | ae(v) |
|     remBinsPass1- - | |
|     abs_level_gtx_flag[ n ][ 1 ] | ae(v) |
|     remBinsPass1- - | |
|   } | |
|   if( lastSigScanPosSb == −1 ) | |
|     lastSigScanPosSb = n | |
|   firstSigScanPosSb = n | |
| } | |
| AbsLevelPass1[ xC ][ yC ] = sig_coeff_flag[ xC ][ yC ] + par_level_flag[ n ] +<br>        abs_level_gtx_flag[ n ][ 0 ] + 2 * abs_level_gtx_flag[ n ][ 1 ] | |
| if( dep_quant_enabled_flag ) | |
|   QState = QStateTransTable[ QState ][ AbsLevelPass1[ xC ][ yC ] & 1 ] | |
| if( remBinsPass1 < 4 ) | |
|   firstPosMode1 = n − 1 | |
| } | |

FIG. 26

| | |
|---|---|
| for( n = numSbCoeff − 1; n >= firstPosMode1; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( abs_level_gtx_flag[ n ][ 1 ] ) | |
| abs_remainder[ n ] | ae(v) |
| AbsLevel[ xC ][ yC ] = AbsLevelPass1[ xC ][ yC ] +2 * abs_remainder[ n ] | |
| } | |
| for( n = firstPosMode1; n >= 0; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| dec_abs_level[ n ] | ae(v) |
| if(AbsLevel[ xC ][ yC ] > 0 ) | |
| firstSigScanPosSb = n | |
| if( dep_quant_enabled_flag ) | |
| QState = QStateTransTable[ QState ][ AbsLevel[ xC ][ yC ] & 1 ] | |
| } | |
| if( dep_quant_enabled_flag \|\| !sign_data_hiding_enabled_flag ) | |
| signHidden = 0 | |
| else | |
| signHidden = ( lastSigScanPosSb − firstSigScanPosSb > 3 ? 1 : 0 ) | |

FIG. 27

| | |
|---|---|
| for( n = numSbCoeff − 1; n >= 0; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( ( AbsLevel[ xC ][ yC ] > 0 ) &&<br>( !signHidden \|\| ( n != firstSigScanPosSb ) ) ) | |
| coeff_sign_flag[ n ] | ae(v) |
| } | |
| if( dep_quant_enabled_flag ) { | |
| QState = startQStateSb | |
| for( n = numSbCoeff − 1; n >= 0; n− −) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( AbsLevel[ xC ][ yC ] > 0 ) | |
| TransCoeffLevel[ x0 ][ y0 ][ cIdx ][ xC ][ yC ] =<br>( 2 * AbsLevel[ xC ][ yC ] − ( QState > 1 ? 1 : 0 ) ) *<br>( 1 − 2 * coeff_sign_flag[ n ] ) | |
| QState = QStateTransTable[ QState ][ par_level_flag[ n ] ] | |
| } else { | |
| sumAbsLevel = 0 | |
| for( n = numSbCoeff − 1; n >= 0; n− −) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( AbsLevel[ xC ][ yC ] > 0 ) { | |
| TransCoeffLevel[ x0 ][ y0 ][ cIdx ][ xC ][ yC ] =<br>AbsLevel[ xC ][ yC ] * ( 1 − 2 * coeff_sign_flag[ n ] ) | |
| if( signHidden ) { | |
| sumAbsLevel += AbsLevel[ xC ][ yC ] | |
| if( ( n == firstSigScanPosSb ) && ( sumAbsLevel % 2 ) == 1 ) ) | |
| TransCoeffLevel[ x0 ][ y0 ][ cIdx ][ xC ][ yC ] =<br>−TransCoeffLevel[ x0 ][ y0 ][ cIdx ][ xC ][ yC ] | |
| } | |
| } | |
| } | |
| } | |
| } | |
| } | |

FIG. 28

| transform_unit( x0, y0, tbWidth, tbHeight, treeType, subTuIndex, chType ) { | Descriptor |
|---|---|
| ( ... ) | |
| if( tu_cbf_luma[ x0 ][ y0 ]  &&  treeType != DUAL_TREE_CHROMA | |
|   &&  ( tbWidth <= 32 )  &&  ( tbHeight <= 32 ) | |
|   &&  ( IntraSubPartitionsSplit[ x0 ][ y0 ] = = ISP_NO_SPLIT )  &&  ( !cu_sbt_flag ) ) { | |
|   if( sps_transform_skip_enabled_flag  &&  !BdpcmFlag[ x0 ][ y0 ]  && | |
|     tbWidth <= MaxTsSize && tbHeight <= MaxTsSize ) | |
|     transform_skip_flag[ x0 ][ y0 ] | ae(v) |
|   if( ( ( CuPredMode[ chType ][ x0 ][ y0 ] = = MODE_INTER  && | |
|     sps_explicit_mts_inter_enabled_flag ) | |
|     | | ( CuPredMode[ chType ][ x0 ][ y0 ] = = MODE_INTRA  && | |
|     sps_explicit_mts_intra_enabled_flag ) )  &&  ( !transform_skip_flag[ x0 ][ y0 ] ) ) | |
|     tu_mts_idx[ x0 ][ y0 ] | ae(v) |
| } | |
| if( tu_cbf_luma[ x0 ][ y0 ] ) { | |
|   if( !transform_skip_flag[ x0 ][ y0 ] ) | |
|     residual_coding( x0, y0, Log2( tbWidth ), Log2( tbHeight ), 0 ) | |
|   else | |
|     residual_ts_coding( x0, y0, Log2( tbWidth ), Log2( tbHeight ), 0 ) | |
| } | |
| if( tu_cbf_cb[ x0 ][ y0 ] ) | |
|   residual_coding( xC, yC, Log2( wC ), Log2( hC ), 1 ) | |
| if( tu_cbf_cr[ x0 ][ y0 ]  && | |
|   !( tu_cbf_cb[ x0 ][ y0 ]  &&  tu_joint_cbcr_residual_flag[ x0 ][ y0 ] )) { | |
|   residual_coding( xC, yC, Log2( wC ), Log2( hC ), 2 ) | |
|   } | |
| } | |

FIG. 29

| residual_ts_coding( x0, y0, log2TbWidth, log2TbHeight, cIdx ) { | Descriptor |
|---|---|
| log2SbSize = ( Min( log2TbWidth, log2TbHeight ) < 2 ? 1 : 2 ) | |
| numSbCoeff = 1 << ( log2SbSize << 1 ) | |
| lastSubBlock = ( 1 << ( log2TbWidth + log2TbHeight − 2 * log2SbSize ) ) − 1 | |
| inferSbCbf = 1 | |
| MaxCcbs = 2 * ( 1 << log2TbWidth ) * ( 1<< log2TbHeight ) | |
| for( i =0; i <= lastSubBlock; i++ ) { | |
|   xS = DiagScanOrder[ log2TbWidth − log2SbSize ][ log2TbHeight − log2SbSize ][ i ][ 0 ] | |
|   yS = DiagScanOrder[ log2TbWidth − log2SbSize ][ log2TbHeight − log2SbSize ][ i ][ 1 ] | |
|   if( ( i != lastSubBlock  | |  !inferSbCbf ) { | |
|     coded_sub_block_flag[ xS ][ yS ] | ae(v) |
|   } | |
|   if( coded_sub_block_flag[ xS ][ yS ]  &&  i < lastSubBlock ) | |
|     inferSbCbf = 0 | |
| /* First scan pass */ | |
|   inferSbSigCoeffFlag = 1 | |
|   for( n = 0; n <= numSbCoeff − 1; n++ ) { | |
|     xC = ( xS << log2SbSize ) + DiagScanOrder[ log2SbSize ][ log2SbSize ][ n ][ 0 ] | |
|     yC = ( yS << log2SbSize ) + DiagScanOrder[ log2SbSize ][ log2SbSize ][ n ][ 1 ] | |
|     if( coded_sub_block_flag[ xS ][ yS ]  && | |
|       ( n != numSbCoeff − 1  | |  !inferSbSigCoeffFlag ) ) { | |
|       sig_coeff_flag[ xC ][ yC ] | ae(v) |
|       MaxCcbs− − | |
|       if( sig_coeff_flag[ xC ][ yC ] ) | |
|         inferSbSigCoeffFlag = 0 | |
|     } | |
|     CoeffSignLevel[ xC ][ yC ] = 0 | |

FIG. 30

| | |
|---|---|
| if( sig_coeff_flag[ xC ][ yC ] ) { | |
|   coeff_sign_flag[ n ] | ae(v) |
|   MaxCcbs-- | |
|   CoeffSignLevel[ xC ][ yC ] = ( coeff_sign_flag[ n ] > 0 ? -1 : 1 ) | |
|   abs_level_gtx_flag[ n ][ 0 ] | ae(v) |
|   MaxCcbs-- | |
|   if( abs_level_gtx_flag[ n ][ 0 ] ) { | |
|     par_level_flag[ n ] | ae(v) |
|     MaxCcbs | |
|     } | |
|   } | |
|   AbsLevelPassX[ xC ][ yC ] = | |
|     sig_coeff_flag[ xC ][ yC ] + par_level_flag[ n ] + abs_level_gtx_flag[ n ][ 0 ] | |
| } | |
| /* Greater than X scan pass (numGtXFlags=5) */ | |
| for( n = 0; n <= numSbCoeff - 1; n++ ) { | |
|   xC = ( xS << log2SbSize ) + DiagScanOrder[ log2SbSize ][ log2SbSize ][ n ][ 0 ] | |
|   yC = ( yS << log2SbSize ) + DiagScanOrder[ log2SbSize ][ log2SbSize ][ n ][ 1 ] | |
|   for( j = 1; j < 5; j++ ) { | |
|     if( abs_level_gtx_flag[ n ][ j - 1 ] ) | |
|       abs_level_gtx_flag[ n ][ j ] | ae(v) |
|     MaxCcbs-- | |
|     AbsLevelPassX[ xC ][ yC ] += 2 * abs_level_gtx_flag[ n ][ j ] | |
|     } | |
|   } | |

FIG. 31

| | |
|---|---|
| /* remainder scan pass */ | |
| for( n = 0; n <= numSbCoeff - 1; n++ ) { | |
|   xC = ( xS << log2SbSize ) + DiagScanOrder[ log2SbSize ][ log2SbSize ][ n ][ 0 ] | |
|   yC = ( yS << log2SbSize ) + DiagScanOrder[ log2SbSize ][ log2SbSize ][ n ][ 1 ] | |
|   if( abs_level_gtx_flag[ n ][ 4 ] ) | |
|     abs_remainder[ n ] | ae(v) |
|   if( intra_bdpcm_flag == 0 ) { | |
|     absRightCoeff = abs( TransCoeffLevel[ x0 ][ y0 ][ cIdx ][ xC - 1 ][ yC ] ) | |
|     absBelowCoeff = abs( TransCoeffLevel[ x0 ][ y0 ][ cIdx ][ xC ][ yC - 1 ] ) | |
|     predCoeff = Max( absRightCoeff, absBelowCoeff ) | |
|     if( AbsLevelPassX[ xC ][ yC ] + abs_remainder[ n ] == 1 && predCoeff > 0 ) | |
|       TransCoeffLevel[ x0 ][ y0 ][ cIdx ][ xC ][ yC ] = | |
|         ( 1 - 2 * coeff_sign_flag[ n ] ) * predCoeff | |
|     else if( AbsLevelPassX[ xC ][ yC ] + abs_remainder[ n ] <= predCoeff ) | |
|       TransCoeffLevel[ x0 ][ y0 ][ cIdx ][ xC ][ yC ] = ( 1 - 2 * coeff_sign_flag[ n ] ) * | |
|         ( AbsLevelPassX[ xC ][ yC ] + abs_remainder[ n ] - 1 ) | |
|     else | |
|       TransCoeffLevel[ x0 ][ y0 ][ cIdx ][ xC ][ yC ] = ( 1 - 2 * coeff_sign_flag[ n ] ) * | |
|         ( AbsLevelPassX[ xC ][ yC ] + abs_remainder[ n ] ) | |
|   } else | |
|     TransCoeffLevel[ x0 ][ y0 ][ cIdx ][ xC ][ yC ] = ( 1 - 2 * coeff_sign_flag[ n ] ) * | |
|       ( AbsLevelPassX[ xC ][ yC ] + abs_remainder[ n ] ) | |
|   } | |
|   } | |
| } | |

FIG. 33

| Q($r_{0,0}$) | Q($r_{1,0}$) -Q($r_{0,0}$) | ... | Q($r_{M-2,0}$) -Q($r_{M-3,0}$) | Q($r_{M-1,0}$) -Q($r_{M-2,0}$) |
|---|---|---|---|---|
| Q($r_{0,1}$) | Q($r_{1,1}$) -Q($r_{0,1}$) | ... | Q($r_{M-2,1}$) -Q($r_{M-3,1}$) | Q($r_{M-1,1}$) -Q($r_{M-2,1}$) |
| ⋮ | ⋮ | ⋮ | ⋮ | ⋮ |
| Q($r_{0,N-2}$) | Q($r_{1,N-2}$) -Q($r_{0,N-2}$) | ... | Q($r_{M-2,N-2}$) -Q($r_{M-3,N-2}$) | Q($r_{M-1,N-2}$) -Q($r_{M-2,N-2}$) |
| Q($r_{0,N-1}$) | Q($r_{1,N-1}$) -Q($r_{0,N-1}$) | ... | Q($r_{M-2,N-1}$) -Q($r_{M-3,N-1}$) | Q($r_{M-1,N-1}$) -Q($r_{M-2,N-1}$) |

Horizontal BDPCM

| Q($r_{0,0}$) | Q($r_{1,0}$) | ... | Q($r_{M-2,0}$) | Q($r_{M-1,0}$) |
|---|---|---|---|---|
| Q($r_{0,1}$) -Q($r_{0,0}$) | Q($r_{1,1}$) -Q($r_{1,0}$) | ... | Q($r_{M-2,1}$) -Q($r_{M-2,0}$) | Q($r_{M-1,1}$) -Q($r_{M-1,0}$) |
| ⋮ | ⋮ | ⋮ | ⋮ | ⋮ |
| Q($r_{0,N-2}$) -Q($r_{0,N-3}$) | Q($r_{1,N-2}$) -Q($r_{1,N-3}$) | ... | Q($r_{M-2,N-2}$) -Q($r_{M-2,N-3}$) | Q($r_{M-1,N-2}$) -Q($r_{M-1,N-3}$) |
| Q($r_{0,N-1}$) -Q($r_{0,N-2}$) | Q($r_{1,N-1}$) -Q($r_{1,N-2}$) | ... | Q($r_{M-2,N-1}$) -Q($r_{M-2,N-2}$) | Q($r_{M-1,N-1}$) -Q($r_{M-1,N-2}$) |

Vertical BDPCM

| seq_parameter_set_rbsp( ) { | Descriptor |
|---|---|
| (...) | |
|   sps_transform_skip_enabled_flag | u(1) |
|   if( sps_transform_skip_enabled_flag ) | |
|     sps_bdpcm_enabled_flag | u(1) |
|   (....) | |
| } | |

| general_constraint_info( ) { | Descriptor |
|---|---|
| (...) | |
|   no_transform_skip_constraint_flag | u(1) |
|   no_bdpcm_constraint_flag | u(1) |
| (...) | |
| } | |

FIG. 38

| coding_unit( x0, y0, cbWidth, cbHeight, cqtDepth, treeType, modeType ) { | Descriptor |
|---|---|
|   chType = treeType = = DUAL_TREE_CHROMA? 1 : 0 | |
|   if( slice_type != I \|\| sps_ibc_enabled_flag \|\| sps_palette_enabled_flag) { | |
|     if( treeType != DUAL_TREE_CHROMA && <br>     !( ( ( cbWidth = = 4 && cbHeight = = 4 ) \|\| modeType = = MODE_TYPE_INTRA ) <br>     && !sps_ibc_enabled_flag ) ) | |
|       cu_skip_flag[ x0 ][ y0 ] | ae(v) |
|     if( cu_skip_flag[ x0 ][ y0 ] = = 0 && slice_type != I <br>     && !( cbWidth = = 4 && cbHeight = = 4 ) && modeType = = MODE_TYPE_ALL ) | |
|       pred_mode_flag | ae(v) |
|     if( ( ( slice_type = = I && cu_skip_flag[ x0 ][ y0 ] = =0 ) \|\| <br>     ( slice_type != I && ( CuPredMode[ chType ][ x0 ][ y0 ] != MODE_INTRA \|\| <br>     ( cbWidth = = 4 && cbHeight = = 4 && cu_skip_flag[ x0 ][ y0 ] = = 0 ) ) ) ) && <br>     cbWidth <= 64 && cbHeight <= 64 && modeType != MODE_TYPE_INTER && <br>     sps_ibc_enabled_flag && treeType != DUAL_TREE_CHROMA ) | |
|       pred_mode_ibc_flag | ae(v) |
|     if( ( ( ( slice_type = = I \|\| ( cbWidth = = 4 && cbHeight = = 4 ) \|\| sps_ibc_enabled_flag ) && <br>     CuPredMode[ x0 ][ y0 ] = = MODE_INTRA ) \|\| <br>     ( slice_type != I && !( cbWidth = = 4 && cbHeight = = 4 ) && !sps_ibc_enabled_flag <br>     && CuPredMode[ x0 ][ y0 ] != MODE_INTRA ) ) && sps_palette_enabled_flag && <br>     cbWidth <= 64 && cbHeight <= 64 && && cu_skip_flag[ x0 ][ y0 ] = = 0 && <br>     modeType != MODE_INTER ) | |
|       pred_mode_plt_flag | ae(v) |
|   } | |
|   if( CuPredMode[ chType ][ x0 ][ y0 ] = = MODE_INTRA \|\| <br>   CuPredMode[ chType ][ x0 ][ y0 ] = = MODE_PLT ) { | |
|     if( treeType = = SINGLE_TREE \|\| treeType = = DUAL_TREE_LUMA ) { | |
|       if( pred_mode_plt_flag ) { | |
|         if( treeType = = DUAL_TREE_LUMA ) | |
|           palette_coding( x0, y0, cbWidth, cbHeight, 0, 1 ) | |
|         else /* SINGLE_TREE */ | |
|           palette_coding( x0, y0, cbWidth, cbHeight, 0, 3 ) | |
|       } else { | |
|         if( sps_bdpcm_enabled_flag && <br>         cbWidth <= MaxTsSize && cbHeight <= MaxTsSize ) | |
|           intra_bdpcm_flag | ae(v) |
|         if( intra_bdpcm_flag ) | |
|           intra_bdpcm_dir_flag | ae(v) |
|   (...) | |

FIG. 39

| transform_unit( x0, y0, tbWidth, tbHeight, treeType, subTuIndex, chType ) { | Descriptor |
|---|---|
| ... | |
| if( tu_cbf_luma[ x0 ][ y0 ] && treeType != DUAL_TREE_CHROMA<br>&& ( tbWidth <= 32 ) && ( tbHeight <= 32 )<br>&& ( IntraSubPartitionsSplit[ x0 ][ y0 ] == ISP_NO_SPLIT ) && ( !cu_sbt_flag ) ) { | |
| if( sps_transform_skip_enabled_flag && !BdpcmFlag[ x0 ][ y0 ] && !cu_transquant_bypass_flag[ x0 ][ y0 ] &&<br>tbWidth <= MaxTsSize && tbHeight <= MaxTsSize ) | |
| transform_skip_flag[ x0 ][ y0 ] | ae(v) |
| if( ( ( CuPredMode[ chType ][ x0 ][ y0 ] == MODE_INTER &&<br>sps_explicit_mts_inter_enabled_flag )<br>\|\| ( CuPredMode[ chType ][ x0 ][ y0 ] == MODE_INTRA &&<br>sps_explicit_mts_intra_enabled_flag ) ) && ( !transform_skip_flag[ x0 ][ y0 ] ) ) | |
| tu_mts_idx[ x0 ][ y0 ] | ae(v) |
| } | |
| ... | |
| if( tu_cbf_luma[ x0 ][ y0 ] ) { | |
| if( !transform_skip_flag[ x0 ][ y0 ] ) | |
| residual_coding( x0, y0, Log2( tbWidth ), Log2( tbHeight ), 0 ) | |
| else | |
| residual_ts_coding( x0, y0, Log2( tbWidth ), Log2( tbHeight ), 0 ) | |
| } | |
| if( tu_cbf_cb[ x0 ][ y0 ] ) | |
| residual_coding( xC, yC, Log2( wC ), Log2( hC ), 1 ) | |
| if( tu_cbf_cr[ x0 ][ y0 ] &&<br>!( tu_cbf_cb[ x0 ][ y0 ] && tu_joint_cbcr_residual_flag[ x0 ][ y0 ] )) { | |
| residual_coding( xC, yC, Log2( wC ), Log2( hC ), 2 ) | |
| } | |
| } | |

3910 — (transform_skip section)
3920 — (residual_coding)
3930 — (residual_ts_coding)

FIG. 40

| transform_unit( x0, y0, tbWidth, tbHeight, treeType, subTuIndex, chType ) { | Descriptor |
|---|---|
| ... | |
| if( tu_cbf_luma[ x0 ][ y0 ] && treeType != DUAL_TREE_CHROMA<br>&& ( tbWidth <= 32 ) && ( tbHeight <= 32 )<br>&& ( IntraSubPartitionsSplit[ x0 ][ y0 ] == ISP_NO_SPLIT ) && ( !cu_sbt_flag ) ) { | |
| if( sps_transform_skip_enabled_flag && !BdpcmFlag[ x0 ][ y0 ] &&<br>tbWidth <= MaxTsSize && tbHeight <= MaxTsSize ) | |
| transform_skip_flag[ x0 ][ y0 ] | ae(v) |
| if( ( ( CuPredMode[ chType ][ x0 ][ y0 ] == MODE_INTER &&<br>sps_explicit_mts_inter_enabled_flag )<br>\|\| ( CuPredMode[ chType ][ x0 ][ y0 ] == MODE_INTRA &&<br>sps_explicit_mts_intra_enabled_flag ) ) && ( !transform_skip_flag[ x0 ][ y0 ] ) ) | |
| tu_mts_idx[ x0 ][ y0 ] | ae(v) |
| } | |
| ... | |
| if( tu_cbf_luma[ x0 ][ y0 ] ) { | |
| if( !transform_skip_flag[ x0 ][ y0 ] \|\| cu_transquant_bypass_flag[ x0 ][ y0 ] ) | |
| residual_coding( x0, y0, Log2( tbWidth ), Log2( tbHeight ), 0 ) | |
| else | |
| residual_ts_coding( x0, y0, Log2( tbWidth ), Log2( tbHeight ), 0 ) | |
| } | |
| if( tu_cbf_cb[ x0 ][ y0 ] ) | |
| residual_coding( xC, yC, Log2( wC ), Log2( hC ), 1 ) | |
| if( tu_cbf_cr[ x0 ][ y0 ] &&<br>!( tu_cbf_cb[ x0 ][ y0 ] && tu_joint_cbcr_residual_flag[ x0 ][ y0 ] )) { | |
| residual_coding( xC, yC, Log2( wC ), Log2( hC ), 2 ) | |
| } | |
| } | |

4010 — (transform_skip section)
4020 — (if !transform_skip_flag)
4030 — (residual_coding)
4040 — (residual_ts_coding)

IMAGE ENCODING/DECODING METHOD AND APPARATUS FOR SIGNALING RESIDUAL CODING METHOD USED FOR ENCODING BLOCK TO WHICH BDPCM IS APPLIED, AND METHOD FOR TRANSMITTING BITSTREAM

CROSS-REFERENCE TO RELATED APPLICATIONS

This application is a Bypass of PCT Application No. PCT/KR2020/013150, with an international filing date of Sep. 25, 2020, which claims the benefit of U.S. Provisional Application No. 62/905,400, filed on Sep. 25, 2019, all of which are incorporated by reference in their entirety herein.

TECHNICAL FIELD

The present disclosure relates to an image encoding/decoding method and apparatus, and, more particularly, to an image encoding/decoding method and apparatus for encoding a residual block, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus capable of improving encoding/decoding efficiency by signaling a residual coding method used for a coding block, to which BDPCM applies.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may comprise determining a residual coding method of a current transform block corresponding to a current coding block, reconstructing residual information of the transform block based on the determined residual coding method and reconstructing the current transform block based on the residual information. Based on block based delta pulse code modulation (BDPCM) applying to the current coding block, the residual coding method of the transform block may be determined based on whether transform skip residual coding is able to be performed on the current transform block An image decoding apparatus according to another aspect of the present disclosure may comprise a memory and at least one processor. The at least one processor may comprise a memory and at least one processor. The at least one processor may determine a residual coding method of a current transform block corresponding to a current coding block, reconstruct residual information of the current transform block based on the determined residual coding method, and reconstruct the current transform block based on the residual information. Based on block based delta pulse code modulation (BDPCM) applying to the current coding block, the residual coding method of the transform block may be determined based on whether transform skip residual coding is able to be performed on the current transform block.

An image encoding method performed by an image encoding apparatus according to another aspect of the present disclosure may comprise determining a residual coding method of a current transform block corresponding to a current coding block, determining residual information of the current transform block based on the determined residual coding method, and encoding the current transform block based on the residual information. Based on block based delta pulse code modulation (BDPCM) applying to the current coding block, the residual coding method of the transform block may be determined based on whether transform skip residual coding is able to be performed on the transform block.

Also, a transmission method according to another aspect of the present disclosure may transmit a bitstream generated by an image encoding apparatus or method of the present disclosure.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus capable of improving encoding/decoding efficiency by signaling a residual coding method used for a coding block, to which BDPCM applies.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that the effects that can be achieved through the present disclosure are not limited to what has been particularly described hereinabove and other advantages of the present disclosure will be more clearly understood from the detailed description.

DESCRIPTION OF DRAWINGS

FIG. 4 is a view showing a partitioning structure of an image according to an embodiment.

FIG. 5 is a view showing an embodiment of a partitioning type of a block according to a multi-type tree structure.

FIGS. 21 to 27 are views consecutively expressing residual_coding syntax.

FIG. 28 is a view expressing transform_unit syntax.

FIGS. 29 to 31 are views consecutively expressing residual_ts_coding syntax.

FIG. 35 is a flowchart illustrating a procedure for reconstructing a current block by applying BDPCM in an image decoding apparatus according to an embodiment.

FIGS. 36 to 38 are views schematically illustrating syntax for signaling information on BDPCM.

FIGS. 39 to 40 are views illustrating syntax of a TU for signaling a residual coding method selected to residual-code a luma component block.

MODE FOR INVENTION

Figure 1:
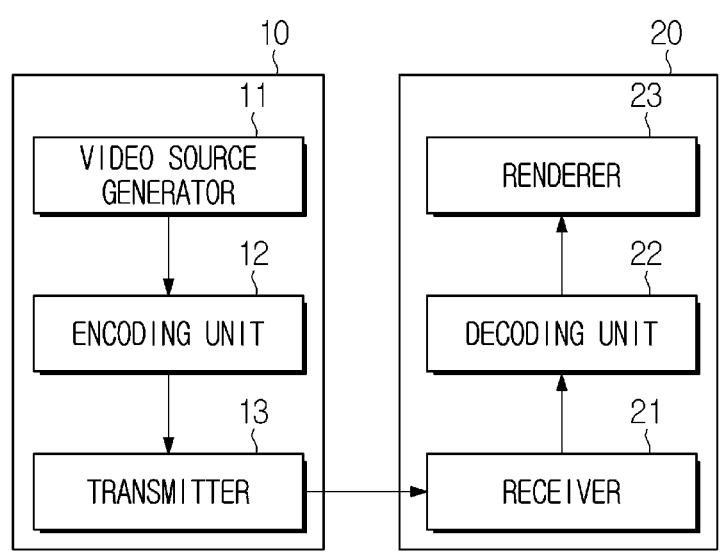
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs). Meanwhile, one tile may include one or more bricks. The brick may represent a rectangular area of CTU rows in a tile. One tile may be split into a plurality of bricks and each brick may include one or more CTU rows belonging to a tile.

A "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include an encoding device 10 and a decoding device 20. The encoding device 10 may deliver encoded video and/or image information or data to the decoding device 20 in the form of a file or streaming via a digital storage medium or network.

The source device 10 according to an embodiment may include a video source generator 11, an encoding unit 12 and a transmitter 13. The decoding device 20 according to an embodiment may include a receiver 21, a decoding unit 22 and a renderer 23. The encoding unit 12 may be called a video/image encoding device, and the decoding unit 22 may be called a video/image decoding device. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding device 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
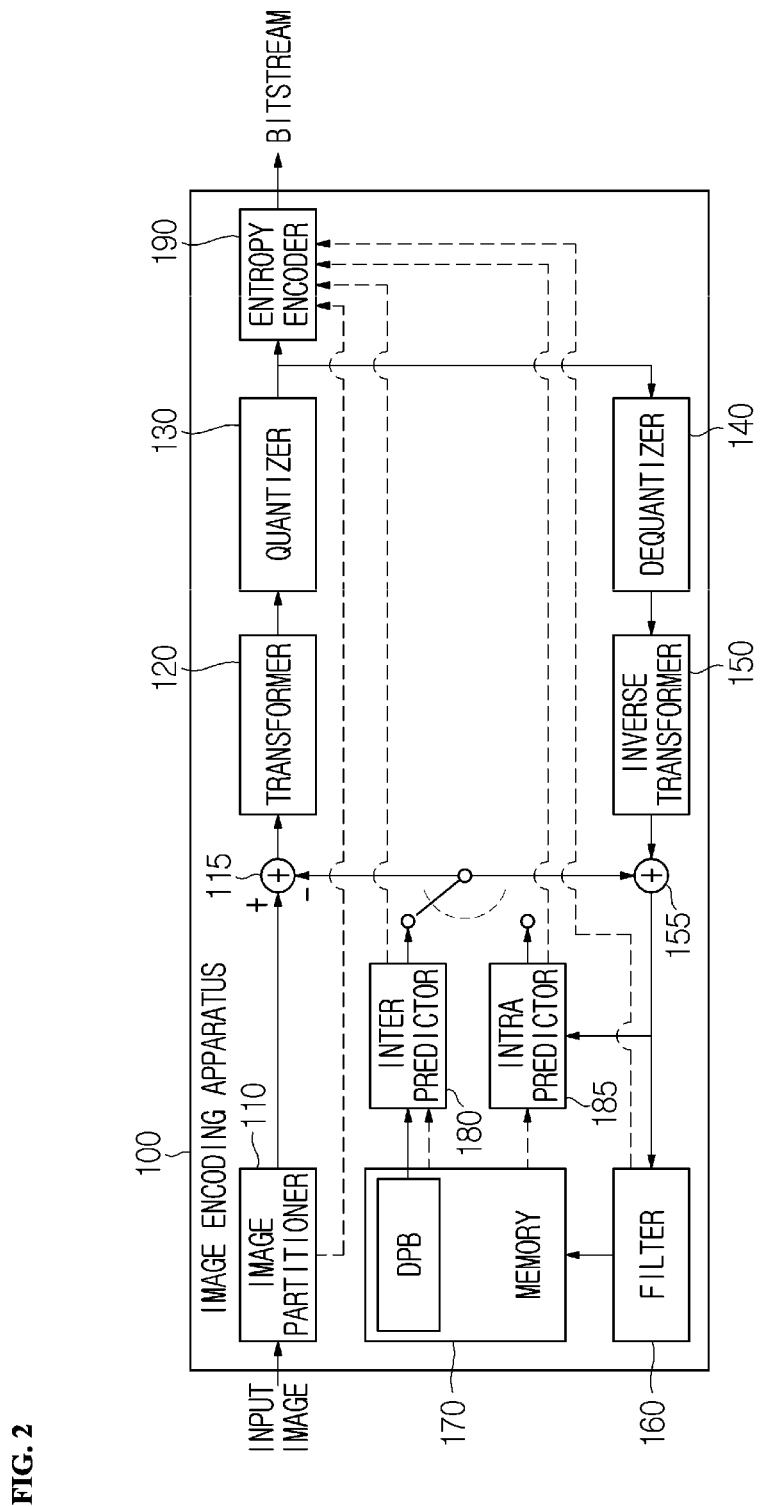
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding device 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding device 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding device 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding device 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding device 100, prediction mismatch between the image encoding device 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
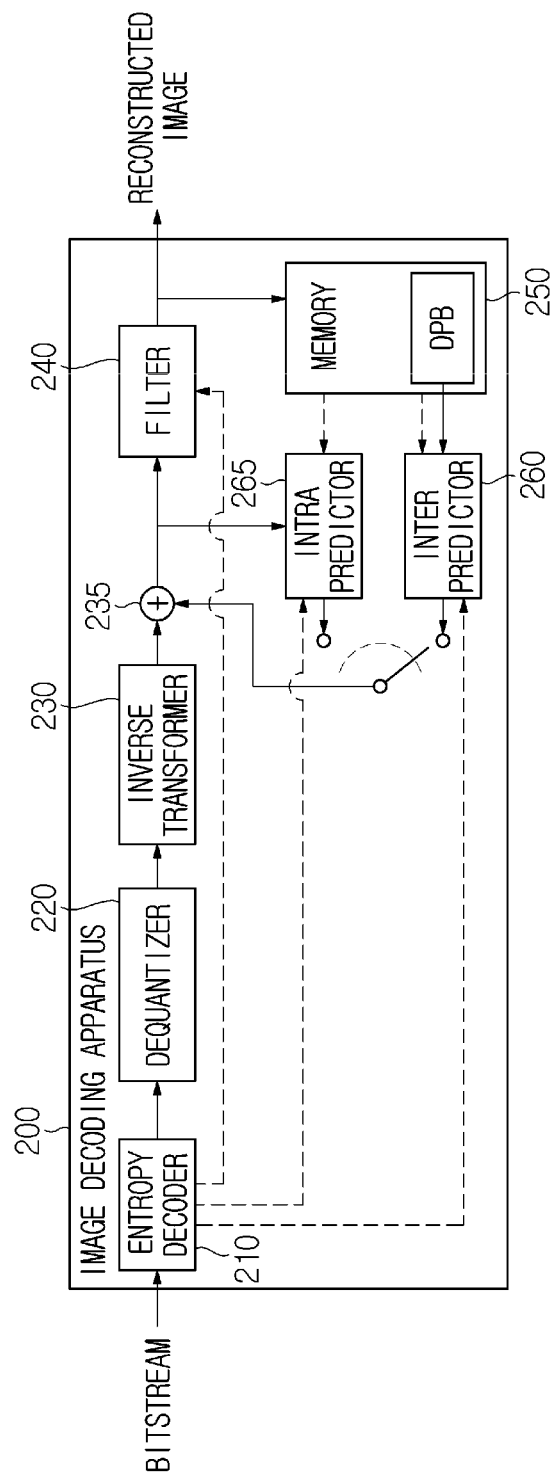
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding device 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding device 200 may be configured by a hardware component (e.g., a decoder or a processor) according to an embodiment. In addition, the memory 250 may include a decoded picture buffer (DPB) or may be configured by a digital storage medium.

The image decoding device 200, which has received a bitstream including video/image information, may reconstruct an image by performing a process corresponding to a process performed by the image encoding device 100 of FIG. 2. For example, the image decoding device 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding device 200 may be reproduced through a reproducing apparatus (not shown).

The image decoding device 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding device 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 160 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding device 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding device 100 may be equally or correspondingly applied to the filter 240, the inter prediction unit 260, and the intra prediction unit 265 of the image decoding device 200.

Overview of Image Partitioning

The video/image coding method according to the present disclosure may be performed based on an image partitioning structure as follows. Specifically, the procedures of prediction, residual processing ((inverse) transform, (de)quantization, etc.), syntax element coding, and filtering, which will be described later, may be performed based on a CTU, CU (and/or TU, PU) derived based on the image partitioning structure. The image may be partitioned in block units and the block partitioning procedure may be performed in the image partitioner 110 of the encoding apparatus. The partitioning related information may be encoded by the entropy encoder 190 and transmitted to the decoding apparatus in the form of a bitstream. The entropy decoder 210 of the decoding apparatus may derive a block partitioning structure of the current picture based on the partitioning related information obtained from the bitstream, and based on this, may perform a series of procedures (e.g., prediction, residual processing, block/picture reconstruction, in-loop filtering, etc.) for image decoding.

Pictures may be partitioned into a sequence of coding tree units (CTUs). FIG. 4 shows an example in which a picture is partitioned into CTUs. The CTU may correspond to a coding tree block (CTB). Alternatively, the CTU may include a coding tree block of luma samples and two coding tree blocks of corresponding chroma samples. For example, for a picture that contains three sample arrays, the CTU may include an N×N block of luma samples and two corresponding blocks of chroma samples.

Overview of Partitioning of CTU

As described above, the coding unit may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structures, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

FIG. 5 is a view showing an embodiment of a partitioning type of a block according to a multi-type tree structure. Partitioning according to the multi-type tree structure may include two types of splitting according to a binary tree structure and two types of splitting according to a ternary tree structure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 4, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 5, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 4, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 5, by horizontal ternary splitting, two CUs having a height which is ¼ of the height of the current CU and having the same width as the current CU and a CU having a height which is half the height of the current CU and having the same width as the current CU may be generated.

Figure 6:
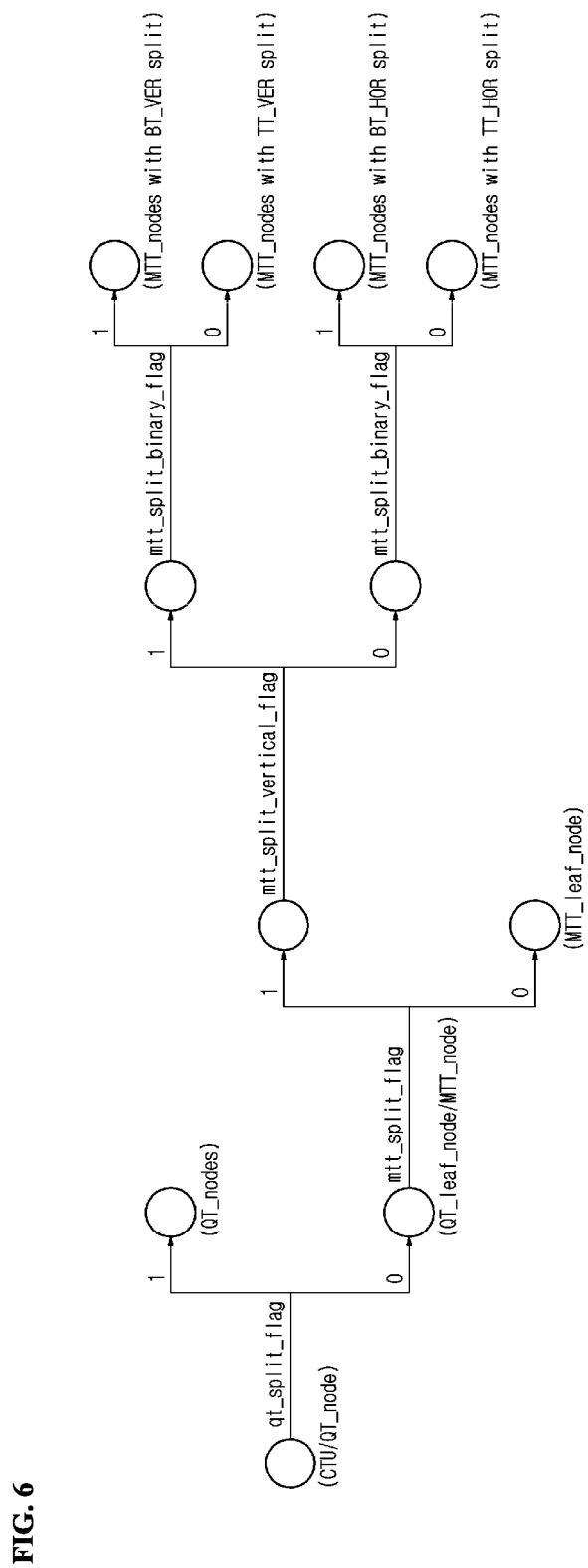
FIG. 6 is a view showing a signaling mechanism of block splitting information in a quadtree with nested multi-type tree structure according to the present disclosure.

FIG. 6 is a view showing a signaling mechanism of block splitting information in a quadtree with nested multi-type tree structure according to the present disclosure.

Here, the CTU is treated as the root node of the quadtree, and is partitioned for the first time into a quadtree structure. Information (e.g., qt_split_flag) indicating whether quadtree splitting is performed with respect to the current CU (CTU or node (QT_node) of the quadtree) may be signaled. For example, when qt_split_flag has a first value (e.g., "1"), the current CU may be quadtree-partitioned. In addition, when qt_split_flag has a second value (e.g., "0"), the current CU is not quadtree-partitioned, but becomes the leaf node (QT_leaf_node) of the quadtree. Each quadtree leaf node may then be further partitioned into multitype tree structures. That is, the leaf node of the quadtree may become the node (MTT_node) of the multi-type tree. In the multitype tree structure, a first flag (e.g., Mtt_split_cu_flag) may be signaled to indicate whether the current node is additionally partitioned. If the corresponding node is additionally partitioned (e.g., if the first flag is 1), a second flag (e.g., Mtt_split_cu_vertical_flag) may be signaled to indicate the splitting direction. For example, the splitting direction may be a vertical direction if the second flag is 1 and may be a horizontal direction if the second flag is 0. Then, a third flag (e.g., Mtt_split_cu_binary_flag) may be signaled to indicate whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical_flag and the mtt_split_cu_binary_flag, a multi-type tree splitting mode (MttSplitMode) of a CU may be derived as shown in Table 1 below. In the following description, the multi-type tree splitting mode may be referred to as a multi-tree splitting type or splitting type.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 7:
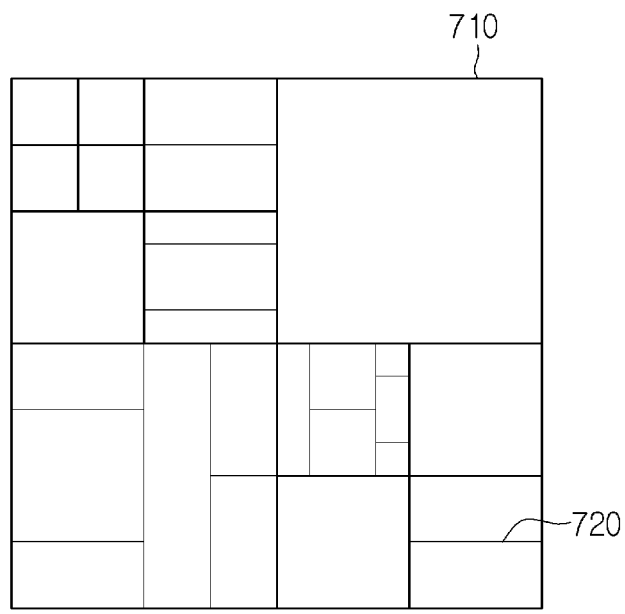
FIG. 7 is a view showing an embodiment in which a CTU is split into multiple CUs.

FIG. 7 is a view showing an example in which a CTU is partitioned into multiple CUs by applying a multi-type tree after applying a quadtree. In FIG. 7, bold block edges 710 represent quadtree partitioning and the remaining edges 720 represent multitype tree partitioning. The CU may correspond to a coding block (CB). In an embodiment, the CU may include a coding block of luma samples and two coding blocks of chroma samples corresponding to the luma samples. A chroma component (sample) CB or TB size may be derived based on a luma component (sample) CB or TB size according to the component ratio according to the color format (chroma format, e.g., 4:4:4, 4:2:2, 4:2:0 or the like) of the picture/image. In case of 4:4:4 color format, the chroma component CB/TB size may be set equal to be luma component CB/TB size. In case of 4:2:2 color format, the width of the chroma component CB/TB may be set to half the width of the luma component CB/TB and the height of the chroma component CB/TB may be set to the height of the luma component CB/TB. In case of 4:2:0 color format, the width of the chroma component CB/TB may be set to half the width of the luma component CB/TB and the height of the chroma component CB/TB may be set to half the height of the luma component CB/TB.

In an embodiment, when the size of the CTU is 128 based on the luma sample unit, the size of the CU may have a size from 128×128 to 4×4 which is the same size as the CTU. In one embodiment, in case of 4:2:0 color format (or chroma format), a chroma CB size may have a size from 64×64 to 2×2.

Meanwhile, in an embodiment, the CU size and the TU size may be the same. Alternatively, there may be a plurality of TUs in a CU region. The TU size generally may represent a luma component (sample) transform block (TB) size.

The TU size may be derived based a largest allowable TB size maxTbSize which is a predetermined value. For example, when the CU size is greater than maxTbSize, a plurality of TUs (TBs) having maxTbSize may be derived from the CU and transform/inverse transform may be performed in units of TU (TB). For example, the largest allowable luma TB size may be 64×64 and the largest allowable chroma TB size may be 32×32. If the width or height of the CB partitioned according to the tree structure is larger than the largest transform width or height, the CB may be automatically (or implicitly) partitioned until the TB size limit in the horizontal and vertical directions is satisfied.

In addition, for example, when intra prediction is applied, an intra prediction mode/type may be derived in units of CU (or CB) and a neighboring reference sample derivation and prediction sample generation procedure may be performed in units of TU (or TB). In this case, there may be one or a plurality of TUs (or TBs) in one CU (or CB) region and, in this case, the plurality of TUs or (TBs) may share the same intra prediction mode/type.

Meanwhile, for a quadtree coding tree scheme with nested multitype tree, the following parameters may be signaled as SPS syntax elements from the encoding apparatus to the decoding apparatus. For example, at least one of a CTU size which is a parameter representing the root node size of a quadtree, MinQTSize which is a parameter representing the minimum allowed quadtree leaf node size, MaxBtSize which is a parameter representing the maximum allowed binary tree root node size, MaxTtSize which is a parameter representing the maximum allowed ternary tree root node size, MaxMttDepth which is a parameter representing the maximum allowed hierarchy depth of multi-type tree splitting from a quadtree leaf node, MinBtSize which is a parameter representing the minimum allowed binary tree leaf node size, or MinTtSize which is a parameter representing the minimum allowed ternary tree leaf node size may be signaled.

As an embodiment of using 4:2:0 chroma format, the CTU size may be set to 128×128 luma blocks and two 64×64 chroma blocks corresponding to the luma blocks. In this case, MinOTSize may be set to 16×16, MaxBtSize may be set to 128×128, MaxTtSzie may be set to 64×64, MinBtSize and MinTtSize may be set to 4×4, and MaxMttDepth may be set to 4. Quadtree partitioning may be applied to the CTU to generate quadtree leaf nodes. The quadtree leaf node may be called a leaf QT node. Quadtree leaf nodes may have a size from a 16×16 size (e.g., the MinOTSize) to a 128×128 size (e.g., the CTU size). If the leaf QT node is 128×128, it may not be additionally partitioned into a binary tree/ternary tree. This is because, in this case, even if partitioned, it exceeds MaxBtsize and MaxTtszie (e.g., 64×64). In other cases, leaf QT nodes may be further partitioned into a multitype tree. Therefore, the leaf QT node is the root node for the multi-type tree, and the leaf QT node may have a multitype tree depth (mttDepth) 0 value. If the multitype tree depth reaches MaxMttdepth (e.g., 4), further partitioning may not be considered further. If the width of the multitype tree node is equal to MinBtSize and less than or equal to 2×MinTtSize, then no further horizontal partitioning may be considered. If the height of the multitype tree node is equal to MinBtSize and less than or equal to 2×MinTtSize, no further vertical partitioning may be considered. When partitioning is not considered, the encoding apparatus may skip signaling of partitioning information. In this case, the decoding apparatus may derive partitioning information with a predetermined value.

Meanwhile, one CTU may include a coding block of luma samples (hereinafter referred to as a "luma block") and two coding blocks of chroma samples corresponding thereto (hereinafter referred to as "chroma blocks"). The above-described coding tree scheme may be equally or separately applied to the luma block and chroma block of the current CU. Specifically, the luma and chroma blocks in one CTU may be partitioned into the same block tree structure and, in this case, the tree structure may be represented as SINGLE_TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, this means that a CU in an I slice/tile group, to which the separate block tree structure is applied, may include a coding block of luma components or coding blocks of two chroma components and a CU of a P or B slice/tile group may include blocks of three color components (a luma component and two chroma components).

Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT_split_type) including information on how many blocks the leaf node of the QT structure is partitioned into and a syntax element (ex. MPT_split_mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the TT structure, the CU of the lower depth may be partitioned into ⅕, ⅓, ⅜, ⅗, ⅔, or ⅝ of the CU of the higher depth in some cases, and the method of partitioning the CU is not limited thereto.

The quadtree coding block structure with the multi-type tree may provide a very flexible block partitioning structure. Because of the partition types supported in a multi-type tree, different partition patterns may potentially result in the same coding block structure in some cases. In the encoding apparatus and the decoding apparatus, by limiting the occurrence of such redundant partition patterns, a data amount of partitioning information may be reduced.

In addition, in encoding and decoding of a video/image according to the present disclosure, an image processing unit may have a hierarchical structure. One picture may be divided into one or more tiles, bricks, slices and/or tile groups. One slice may include one or more bricks. One brick may include one or more CTU rows in a tile. A slice may include an integer number of bricks of a picture. One tile group may include one or more tiles. One tile may include one or more CTUs. A CTU may be split into one or more CUs. A tile may be a rectangular region including a specific tile row and a specific tile column composed of a plurality of CTUs in a picture. A tile group may include an integer number of tiles according to tile raster scan in a picture. A slice header may carry information/parameters applicable to a corresponding slice (blocks in a slice). When an encoding apparatus or a decoding apparatus has a multi-core processor, an encoding/decoding procedure for the tile, the slice, the brick and/or the tile group may be performed in parallel.

In the present disclosure, the names or concepts of the slice or the tile group may be used interchangeably. That is, a tile group header may be referred to as a slice header. Here, a slice may have one of slice types including an intra (I) slice, a predictive (P) slice and a bi-predictive (B) slice. For blocks in an I slice, inter prediction is not used for prediction and only intra prediction may be used. Of course, even in this case, an original sample value may be coded and signaled without prediction. For blocks in a P slice, intra prediction or inter prediction may be used. When inter prediction is used, only uni-prediction may be used. Meanwhile, for blocks in a B slice, intra prediction or inter prediction may be used. When inter prediction is used, up to bi-prediction may be used.

The encoding apparatus may determine a tile/tile group, brick, slice and maximum and minimum coding unit size according to the characteristics (e.g., resolution) of a video image or in consideration of coding efficiency and parallel processing. In addition, information on this or information capable of deriving this may be included in a bitstream.

The decoding apparatus may obtain information specifying whether a tile/tile group of a current picture, a brick or a slice or a CTU in a tile is partitioned into a plurality of coding units. The encoding apparatus and the decoding apparatus may increase encoding efficiency, by signaling such information under specific conditions.

The slice header (slice header syntax) may include information/parameters that may be commonly applied to the slice. The APS (APS syntax) or PPS (PPS syntax) may include information/parameters that may be commonly applied to one or more pictures. The SPS (SPS syntax) may include information/parameters that may be commonly applied to one or more sequences. The VPS (VPS syntax) may include information/parameters that may be commonly applied to multiple layers. The DPS (DPS syntax) may include information/parameters that may be commonly applied to the overall video. The DPS may include information/parameters associated with combination of a coded video sequence (CVS).

In addition, for example, information on partitioning and configuration of the tile/tile group/brick/slice may be constructed at an encoding stage through the high level syntax and transmitted to the decoding apparatus in the form of a bitstream.

Quantization/Dequantization

As described above, the quantizer of the encoding apparatus may derive quantized transform coefficients by applying quantization to transform coefficients, and the dequantizer of the encoding apparatus or the dequantizer of the decoding apparatus may derive transform coefficients by applying dequantization to the quantized transform coefficients.

In encoding and decoding of a moving image/still image, a quantization rate may be changed and a compression rate may be adjusted using the changed quantization rate. From the viewpoint of implementation, in consideration of complexity, instead of directly using the quantization rate, a quantization parameter (QP) may be used. For example, quantization parameters having integer values from 0 to 63 may be used and each quantization parameter value may correspond to an actual quantization rate. In addition, a quantization parameter $QP_Y$ for a luma component (luma sample) and a quantization parameter $QP_C$ for a chroma component (chroma sample) may be differently set.

In the quantization process, a transform coefficient C may be received and divided by a quantization rate Qstep, thereby obtaining a quantized transform. In this case, the quantization rate may be multiplied by a scale in consideration of computational complexity to make an integer, and shift operation may be performed by a value corresponding to the scale value. A quantization scale may be derived based on a product of the quantization rate and the scale value. That is, the quantization scale may be derived according to QP. By applying the quantization scale to the transform coefficient C, a quantized transform coefficient C' may be derived.

The dequantization process is an inverse process of the quantization process. By multiplying the quantized transform coefficient C' by the quantization rate Qstep, thereby obtaining a reconstructed transform coefficient C". In addition, a level scale may be derived according to the quantization parameter, and the level scale may be applied to the quantized transform coefficient C', thereby deriving the reconstructed transform coefficient C". The reconstructed transform coefficient C" may be slightly different from an initial transform coefficient C due to loss of the transform and/or quantization process. Accordingly, the even in the encoding apparatus, dequantization may be performed in the same manner as in the decoding apparatus.

Meanwhile, adaptive frequency weighting quantization technology for adjusting a quantization strength according to the frequency may be applied. The adaptive frequency weighting quantization technology refers to a method of differently applying a quantization strength according to the frequency. In adaptive frequency weighting quantization, the quantization strength may be differently applied according to the frequency using a predefined quantization scaling matrix. That is, the above-described quantization/dequantization process may be performed based on the quantization scaling matrix. For example, different quantization scaling matrices may be used according to the size of the current block and/or whether a prediction mode applied to the current block is inter prediction or intra prediction in order to generate the residual signal of the current block. The quantization scaling matrix may be referred to as a quantization matrix or a scaling matrix. The quantization scaling matrix may be predefined. In addition, for frequency adaptive scaling, frequency quantization scale information for the quantization scaling matrix may be constructed/encoded in the encoding apparatus and signaled to the decoding apparatus. The frequency quantization scale information may be referred to as quantization scaling information. The frequency quantization scale information may include scaling list data scaling_list_data. The (modified) quantization scaling matrix may be derived based on the scaling list data. In addition, the frequency quantization scale information may include a present flag indicating whether the scaling list data is present. Alternatively, when the scaling list data is signaled at a higher level (e.g., SPS), information indicating whether the scaling list data is modified at a lower level (e.g., PPS or tile group header, etc.) may be further included.

Transform/Inverse Transform

As described above, the encoding apparatus may derive a residual block (residual samples) based on a block (prediction blocks) predicted through intra/inter/IBC prediction, and derive quantized transform coefficients by applying transform and quantization to the derived residual samples. Information on the quantized transform coefficients (residual information) may be included and encoded in a residual coding syntax and output in the form of a bitstream. The decoding apparatus may acquire and decode information on the quantized transform coefficients (residual information) from the bitstream to derive quantized transform coefficients. The decoding apparatus may derive residual samples through dequantization/inverse transform based on the quantized transform coefficients. As described above, at least one of quantization/dequantization and/or transform/inverse transform may be skipped. When transform/inverse transform is skipped, the transform coefficient may be referred to as a coefficient or a residual coefficient or may still be referred to a transform coefficient for uniformity of expression. Whether transform/inverse transform is skipped may be signaled based on a transform skip flag (e.g., transform_skip_flag).

Transform/inverse transform may be performed based on transform kernel(s). For example, a multiple transform selection (MTS) scheme for performing transform/inverse transform is applicable. In this case, some of a plurality of transform kernel sets may be selected and applied to a current block. A transform kernel may be referred to as various terms such as a transform matrix or a transform type. For example, the transform kernel set may indicate a combination of a vertical-direction transform kernel (vertical transform kernel) and a horizontal-direction transform kernel (horizontal transform kernel).

Transform/inverse transform may be performed in units of CU or TU. That is, transform/inverse transform is applicable to residual samples in a CU or residual samples in a TU. A CU size may be equal to a TU size or a plurality of TUs may be present in a CU region. Meanwhile, the CU size may generally indicate a luma component (sample) CB size. The TU size may generally indicate a luma component (sample) TB size. A chroma component (sample) CB or TB size may be derived based on the luma component (sample) CB or TB size according to a component ratio according to a color format (chroma format) (e.g., 4:4:4, 4:2:2, 4:2:0, etc.). The TU size may be derived based on maxTbSize. For example, when the CU size is greater than maxTbSize, a plurality of TUs (TBs) of maxTbSize may be derived from the CU and transform/inverse transform may be performed in units of TU (TB). maxTbSize may be considered to determine whether to apply various intra prediction types such as ISP. Information on maxTbSize may be predetermined or may be generated and encoded in the encoding apparatus and signaled to the encoding apparatus.

Entropy Coding

All or some of video/image information may be entropy-encoded by the entropy encoder 190 as described above with reference to FIG. 2, and all or some of the video/image information described with reference to FIG. 3 may be entropy-decoded by the entropy decoder 310. In this case, the video/image information may be encoded/decoded in units of a syntax element. In the present disclosure, encoding/decoding information may include encoding/decoding by the method described in this paragraph.

Figure 8:
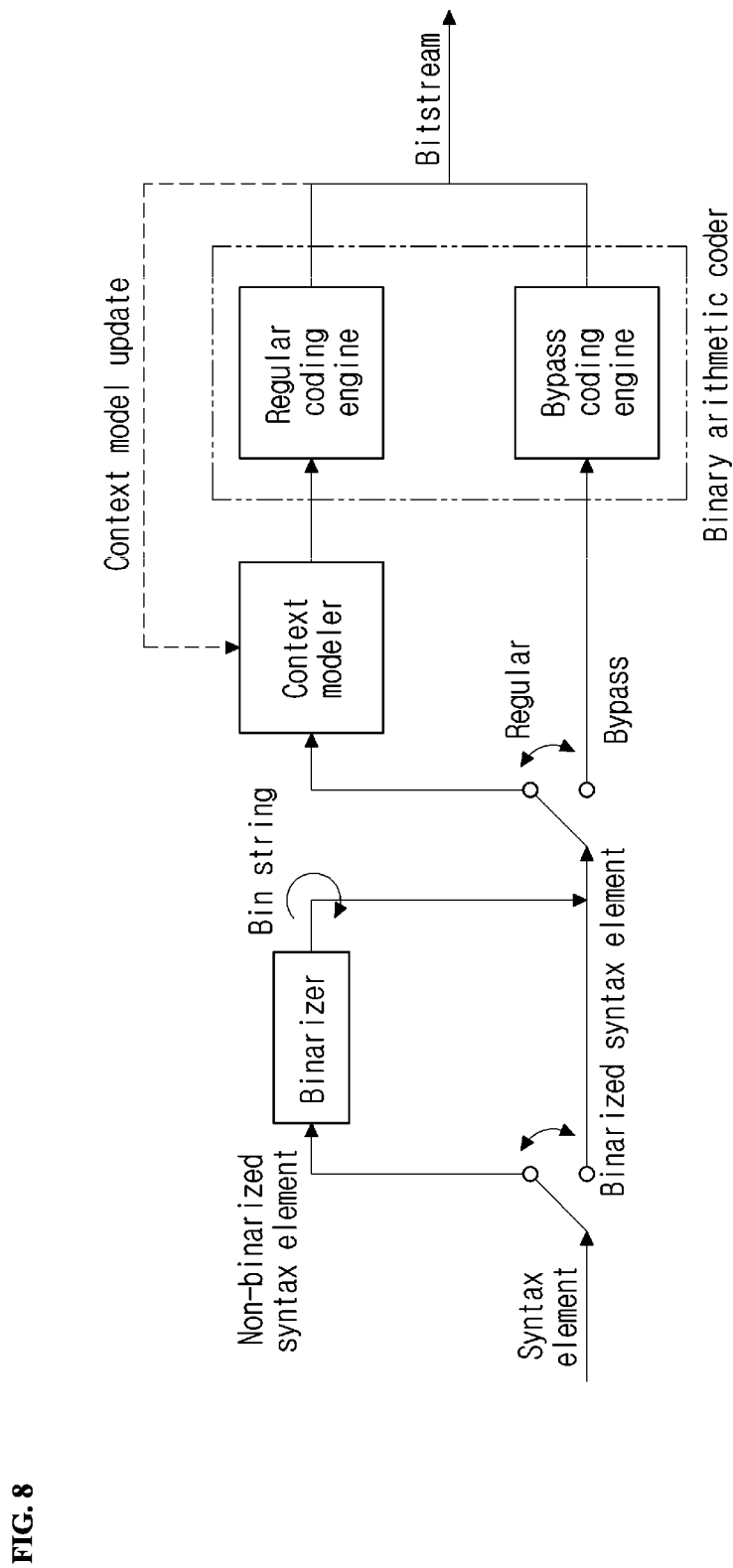
FIG. 8 is a block diagram of a CABAC according to an embodiment for encoding one syntax element.

FIG. 8 is a block diagram of a CABAC for encoding one syntax element. In the encoding process of CABAC, first, when an input signal is a syntax element other than a binary value, the input signal may be transformed into a binary value through binarization. When the input signal already has a binary value, binarization may be bypassed. Here, a binary number 0 or 1 configuring a binary value may be referred to as a bin. For example, when a binary string (bin string) after binarization is 110, each of 1, 1 and 0 may be referred to as one bin. The bin(s) for one syntax element may represent the value of a corresponding syntax element.

The binarized bins may be input to a regular coding engine or a bypass coding engine. The regular coding engine may allocate a context model reflecting a probability value to a corresponding bin and encode the corresponding bit based on the allocated context model. The regular coding engine may code each bin and then update a probability model for the corresponding bin. The bins coded in this way may be referred to as context-coded bins. The bypass coding engine may bypass a procedure for estimating a probability with respect to an input bin and a procedure for updating a probability mode applied to a corresponding bin after coding. The bypass coding engine may code an input bin by applying a uniform probability distribution (e.g., 50:50) instead of allocating a context, thereby improving a coding speed. Bins coded in this way may be referred to as a bypass bin. A context model may be allocated and updated for each context-coded (regularly coded) bin, and the context model may be indicated based on ctxidx or ctxInc. ctxidx may be derived based on ctxInc. Specifically, for example, a context index ctxidx indicating the context model for each of the regularly coded bins may be derived as a sum of a context index increment (ctxInc) and a context index offset (ctxIdxOffset). Here, ctxInc may be differently derived for each bin. ctxIdxOffset may be represented by a lowest value of ctxIdx. The lowest value of ctxIdx may be referred to as an initial value initValue of ctxIdx. ctxIdxOffset is generally a value used to be distinguished from context models for other syntax elements, and a context model for one syntax element may be distinguished/derived based on ctxinc.

In the entropy encoding procedure, whether encoding is performed through the regular coding engine or the bypass coding engine may be determined and a coding path may be switched. Entropy decoding may be performed in the reverse order of the same process as entropy encoding.

Figure 9:
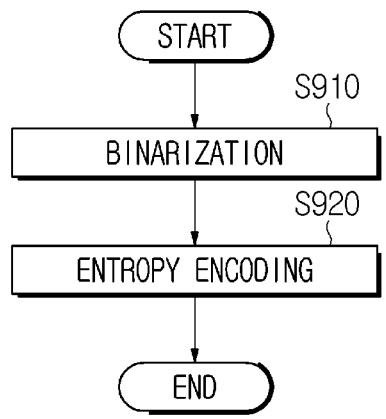
FIGS. 9 to 12 are views illustrating entropy encoding and decoding according to an embodiment.
Figure 10:
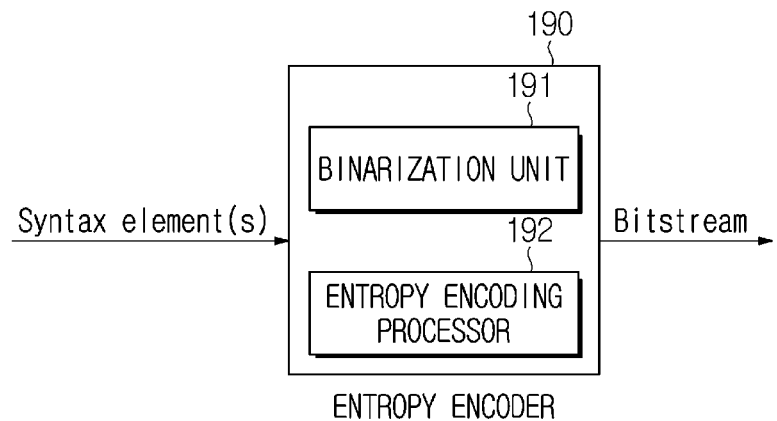

The above-described entropy coding may be performed, for example, as shown in FIGS. 9 and 10. Referring to FIGS. 9 and 10, the encoding apparatus (entropy encoder) may perform an entropy coding procedure for image/video information. The image/video information may include partitioning related information, prediction related information (e.g., inter/intra prediction distinction information, intra prediction mode information, inter prediction mode information, etc.), residual information, in-loop filtering related information, etc. or may include various syntax elements related thereto. Entropy coding may be performed in units of a syntax element. Steps S910 to S920 of FIG. 9 may be performed by the entropy encoder 190 of the encoding apparatus of FIG. 2.

The encoding apparatus may perform binarization with respect to a target syntax element (S910). Here, binarization may be based on various binarization methods such as a Truncated Rice binarization process, Fixed-length binarization process, etc., and the binarization method for the target syntax element may be predefined. The binarization procedure may be performed by a binarization unit 191 in the entropy encoder 190.

The encoding apparatus may entropy encoding with respect to the target syntax element (S920). The encoding apparatus may perform regular coding based (context based) or bypass coding based encoding with respect to a bin string of the target syntax element based on an entropy coding technique such as CABAC (context-adaptive arithmetic coding) or CAVLC (context-adaptive variable length coding), and the output thereof may be included in a bitstream. The entropy encoding procedure may be performed by an entropy encoding processor 192 in the entropy encoder 190. As described above, the bitstream may be transmitted to the decoding apparatus through a (digital) storage medium or a network.

Figure 11:
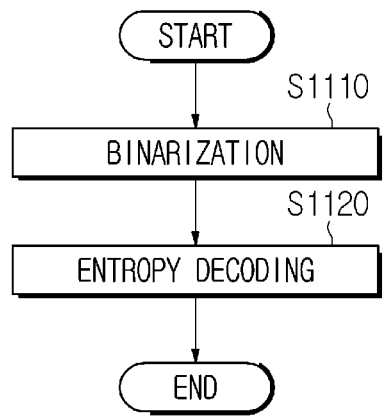
Figure 12:
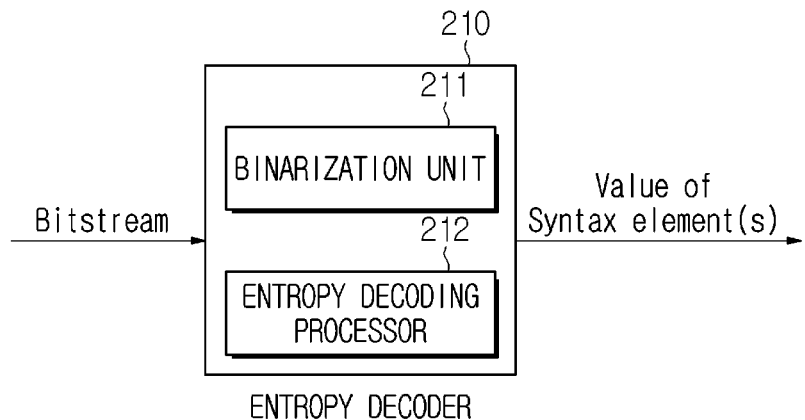

Referring to FIGS. 11 and 12, the decoding apparatus (entropy decoder) may decode encoded image/video information. The image/video information may include partitioning related information, prediction related information (e.g., inter/intra prediction distinction information, intra prediction mode information, inter prediction mode information, etc.), residual information, in-loop filtering related information, etc. or may include various syntax elements related thereto. Entropy coding may be performed in units of a syntax element. Steps S1110 to S1120 may be performed by the entropy decoder 210 of the decoding apparatus of FIG. 3.

The decoding apparatus may perform binarization with respect to a target syntax element (S1110). Here, binarization may be based on various binarization methods such as a Truncated Rice binarization process, Fixed-length binarization process, etc., and the binarization method for the target syntax element may be predefined. The decoding apparatus may derive available bin strings (bin string candidates) for available values of the target syntax element through the binarization procedure. The binarization procedure may be performed by a binarization unit 211 in the entropy decoder 210.

The decoding apparatus may perform entropy decoding with respect to the target syntax element (S1120). The decoding apparatus may compare the derived bin string with available bin strings for a corresponding syntax element, while sequentially decoding and parsing the bins for the target syntax element from input bit(s) in the bitstream. If the derived bin string is equal to one of the available bin strings, a value corresponding to the corresponding bin string may be derived as a value of the corresponding syntax element. If not, the above-described procedure may be performed again after a next bit in the bitstream is further parsed. Through such a process, corresponding information may be signaled using a variable length bit without using a start or end bit for specific information (specific syntax element) in the bitstream. Through this, a relatively fewer bits may be allocated to a low value and overall coding efficiency may be improved.

The decoding apparatus may perform context based or bypass based decoding with respect to the bins in the bin string from the bitstream based on an entropy coding technique such as CABAC or CAVLC. The entropy decoding procedure may be performed by an entropy decoding processor 212 in the entropy decoder 210. The bitstream may include a variety of information for image/video decoding as described above. As described above, the bitstream may be transmitted to the decoding apparatus through a (digital) storage medium or a network.

In the present disclosure, a table (syntax table) including syntax elements may be used to indicate signaling of information from the encoding apparatus to the decoding apparatus. The order of the syntax elements of the table including the syntax elements used in the present disclosure may indicate the parsing order of the syntax elements from the bitstream. The encoding apparatus may construct and encode the syntax element such that the decoding apparatus parses the syntax element in the parsing order, and the decoding apparatus may parse and decode the syntax elements of the corresponding syntax table from the bitstream according to the parsing order and obtain the values of the syntax elements.

General Image/Video Coding Procedure

In image/video coding, a picture configuring an image/video may be encoded/decoded according to a decoding order. A picture order corresponding to an output order of the decoded picture may be set differently from the decoding order, and, based on this, not only forward prediction but also backward prediction may be performed during inter prediction.

Figure 13:
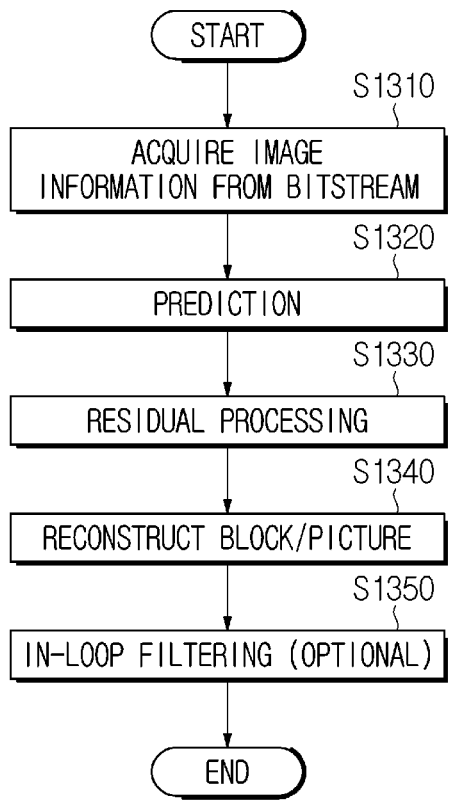
FIGS. 13 and 14 are views showing an example of a picture decoding and encoding procedure according to an embodiment.

FIG. 13 shows an example of a schematic picture decoding procedure, to which embodiment(s) of the present disclosure is applicable. In FIG. 13, S1310 may be performed in the entropy decoder 210 of the decoding apparatus, S1320 may be performed in a prediction unit including the intra prediction unit 265 and the inter prediction unit 260, S1330 may be performed in a residual processor including the dequantizer 220 and the inverse transformer 230, S1340 may be performed in the adder 235, and S1350 may be performed in the filter 240. S1310 may include the information decoding procedure described in the present disclosure, S1320 may include the inter/intra prediction procedure described in the present disclosure, S1330 may include a residual processing procedure described in the present disclosure, S1340 may include the block/picture reconstruction procedure described in the present disclosure, and S1350 may include the in-loop filtering procedure described in the present disclosure.

Referring to FIG. 13, the picture decoding procedure may schematically include a procedure (S1310) for obtaining image/video information (through decoding) from a bitstream, a picture reconstruction procedure (S1320 to S1340) and an in-loop filtering procedure (S1350) for a reconstructed picture. The picture reconstruction procedure may be performed based on prediction samples and residual samples obtained through inter/intra prediction (S1320) and residual processing (S1330) (dequantization and inverse transform of the quantized transform coefficient) described in the present disclosure. A modified reconstructed picture may be generated through the in-loop filtering procedure for the reconstructed picture generated through the picture reconstruction procedure, the modified reconstructed picture may be output as a decoded picture, stored in a decoded picture buffer or memory 250 of the decoding apparatus and used as a reference picture in the inter prediction procedure when decoding the picture later. In some cases, the in-loop filtering procedure may be omitted. In this case, the reconstructed picture may be output as a decoded picture, stored in a decoded picture buffer or memory 250 of the decoding apparatus, and used as a reference picture in the inter prediction procedure when decoding the picture later. The in-loop filtering procedure (S1350) may include a deblocking filtering procedure, a sample adaptive offset (SAO) procedure, an adaptive loop filter (ALF) procedure and/or a bi-lateral filter procedure, as described above, some or all of which may be omitted. In addition, one or some of the deblocking filtering procedure, the sample adaptive offset (SAO) procedure, the adaptive loop filter (ALF) procedure and/or the bi-lateral filter procedure may be sequentially applied or all of them may be sequentially applied. For example, after the deblocking filtering procedure is applied to the reconstructed picture, the SAO procedure may be performed. Alternatively, for example, after the deblocking filtering procedure is applied to the reconstructed picture, the ALF procedure may be performed. This may be similarly performed even in the encoding apparatus.

Figure 14:
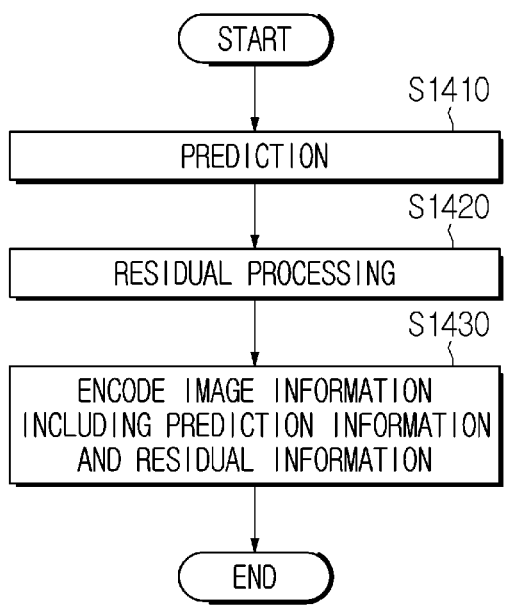

FIG. 14 shows an example of a schematic picture encoding procedure, to which embodiment(s) of the present disclosure is applicable. In FIG. 14, S1410 may be performed in the prediction unit including the intra prediction unit 185 or inter prediction unit 180 of the encoding apparatus described above with reference to FIG. 2, S1420 may be performed in a residual processor including the transformer 120 and/or the quantizer 130, and S1430 may be performed in the entropy encoder 190. S1410 may include the inter/intra prediction procedure described in the present disclosure, S1420 may include the residual processing procedure described in the present disclosure, and S1430 may include the information encoding procedure described in the present disclosure.

Referring to FIG. 14, the picture encoding procedure may schematically include not only a procedure for encoding and outputting information for picture reconstruction (e.g., prediction information, residual information, partitioning information, etc.) in the form of a bitstream but also a procedure for generating a reconstructed picture for a current picture and a procedure (optional) for applying in-loop filtering to a reconstructed picture, as described with respect to FIG. 2. The encoding apparatus may derive (modified) residual samples from a quantized transform coefficient through the dequantizer 140 and the inverse transformer 150, and generate the reconstructed picture based on the prediction samples which are output of S1410 and the (modified) residual samples. The reconstructed picture generated in this way may be equal to the reconstructed picture generated in the decoding apparatus. The modified reconstructed picture may be generated through the in-loop filtering procedure for the reconstructed picture, may be stored in the decoded picture buffer or memory 170, and may be used as a reference picture in the inter prediction procedure when encoding the picture later, similarly to the decoding apparatus. As described above, in some cases, some or all of the in-loop filtering procedure may be omitted. When the in-loop filtering procedure is performed, (in-loop) filtering related information (parameter) may be encoded in the entropy encoder 190 and output in the form of a bitstream, and the decoding apparatus may perform the in-loop filtering procedure using the same method as the encoding apparatus based on the filtering related information.

Through such an in-loop filtering procedure, noise occurring during image/video coding, such as blocking artifact and ringing artifact, may be reduced and subjective/objective visual quality may be improved. In addition, by performing the in-loop filtering procedure in both the encoding apparatus and the decoding apparatus, the encoding apparatus and the decoding apparatus may derive the same prediction result, picture coding reliability may be increased and the amount of data to be transmitted for picture coding may be reduced.

As described above, the picture reconstruction procedure may be performed not only in the decoding apparatus but also in the encoding apparatus. A reconstructed block may be generated based on intra prediction/inter prediction in units of blocks, and a reconstructed picture including reconstructed blocks may be generated. When a current picture/slice/tile group is an I picture/slice/tile group, blocks included in the current picture/slice/tile group may be reconstructed based on only intra prediction. Meanwhile, when the current picture/slice/tile group is a P or B picture/slice/tile group, blocks included in the current picture/slice/tile group may be reconstructed based on intra prediction or inter prediction. In this case, inter prediction may be applied to some blocks in the current picture/slice/tile group and intra prediction may be applied to the remaining blocks. The color component of the picture may include a luma component and a chroma component and the methods and embodiments of the present disclosure are applicable to the luma component and the chroma component unless explicitly limited in the present disclosure.

Example of Coding Layer and Structure

A coded video/image according to the present disclosure may be processed, for example, according to a coding layer and structure which will be described below.

Figure 15:
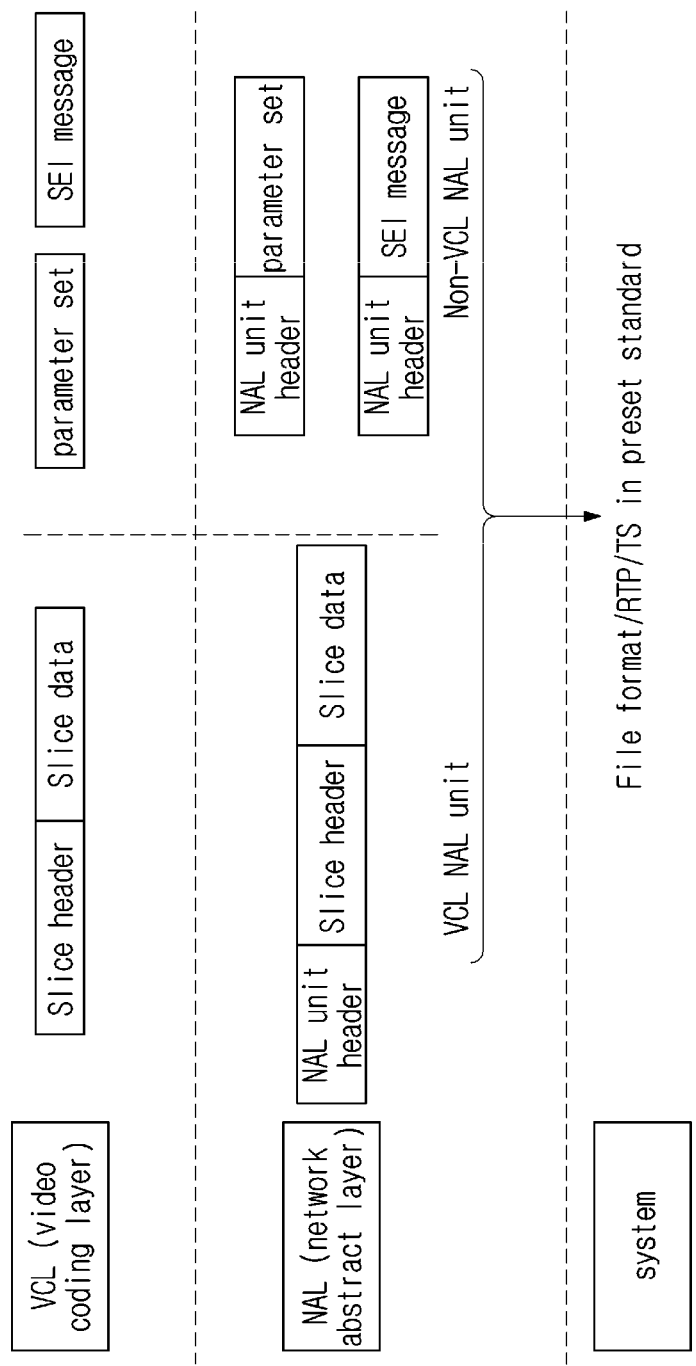
FIG. 15 is a view illustrating a hierarchical structure for a coded image according to an embodiment.

FIG. 15 is a view showing a hierarchical structure for a coded image. The coded image may be classified into a video coding layer (VCL) for an image decoding process and handling itself, a lower system for transmitting and storing encoded information, and a network abstraction layer (NAL) present between the VCL and the lower system and responsible for a network adaptation function.

In the VCL, VCL data including compressed image data (slice data) may be generated or a supplemental enhancement information (SEI) message additionally required for a decoding process of an image or a parameter set including information such as a picture parameter set (PPS), a sequence parameter set (SPS) or a video parameter set (VPS) may be generated.

In the NAL, header information (NAL unit header) may be added to a raw byte sequence payload (RBSP) generated in the VCL to generate an NAL unit. In this case, the RBSP refers to slice data, a parameter set, an SEI message generated in the VCL. The NAL unit header may include NAL unit type information specified according to RBSP data included in a corresponding NAL unit.

As shown in the figure, the NAL unit may be classified into a VCL NAL unit and a non-VCL NAL unit according to the RBSP generated in the VCL. The VCL NAL unit may mean a NAL unit including information on an image (slice data), and the Non-VCL NAL unit may mean a NAL unit including information (parameter set or SEI message) required to decode an image.

The VCL NAL unit and the Non-VCL NAL unit may be attached with header information and transmitted through a network according to the data standard of the lower system. For example, the NAL unit may be modified into a data format of a predetermined standard, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signaled.

For example, this may be largely classified into a VCL NAL unit type and a non-VCL NAL unit type depending on whether the NAL unit includes information on an image (slice data). The VCL NAL unit type may be classified according to the property and type of the picture included in the VCL NAL unit, and the Non-VCL NAL unit type may be classified according to the type of a parameter set.

An example of the NAL unit type specified according to the type of the parameter set included in the Non-VCL NAL unit type will be listed below.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

The above-described NAL unit types may have syntax information for a NAL unit type, and the syntax information may be stored in a NAL unit header and signaled. For example, the syntax information may be nal_unit_type, and the NAL unit types may be specified as nal_unit_type values.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may information/parameters commonly applicable to multiple layers. The DPS (DPS syntax) may include information/parameters commonly applicable to an overall video. The DPS may include information/parameters related to concatenation of a coded video sequence (CVS). In the present disclosure, a high level syntax (HLS) may include at least one of the APS syntax, the PPS syntax, the SPS syntax, the VPS syntax, the DPS syntax or the slice header syntax.

In the present disclosure, image/video information encoded in the encoding apparatus and signaled to the decoding apparatus in the form of a bitstream may include not only in-picture partitioning related information, intra/inter prediction information, residual information, in-loop filtering information but also information included in the slice header, information included in the APS, information included in the PPS, information included in the SPS, and/or information included in the VPS.

Overview of Intra Prediction

Hereinafter, intra prediction performed by the encoding and decoding apparatus described above will be described in greater detail. Intra prediction may represent prediction for generating prediction samples for a current block based on reference samples in a picture to which a current block belongs (hereinafter referred to as a current picture).

Figure 16:
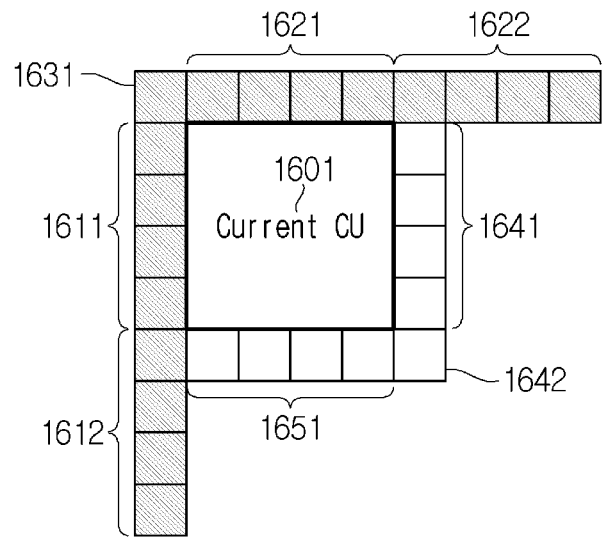
FIG. 16 is a view illustrating a neighboring reference sample according to an embodiment.
Figure 17:
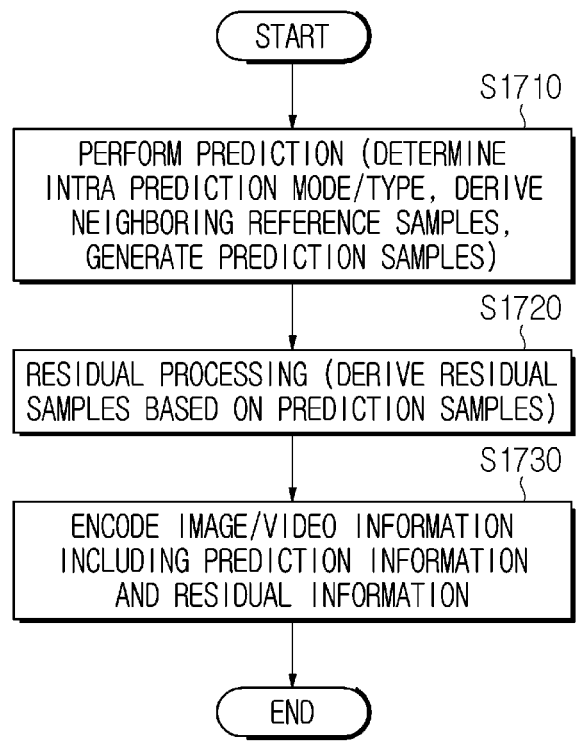
FIGS. 17 to 18 are views illustrating intra prediction according to an embodiment.
Figure 18:
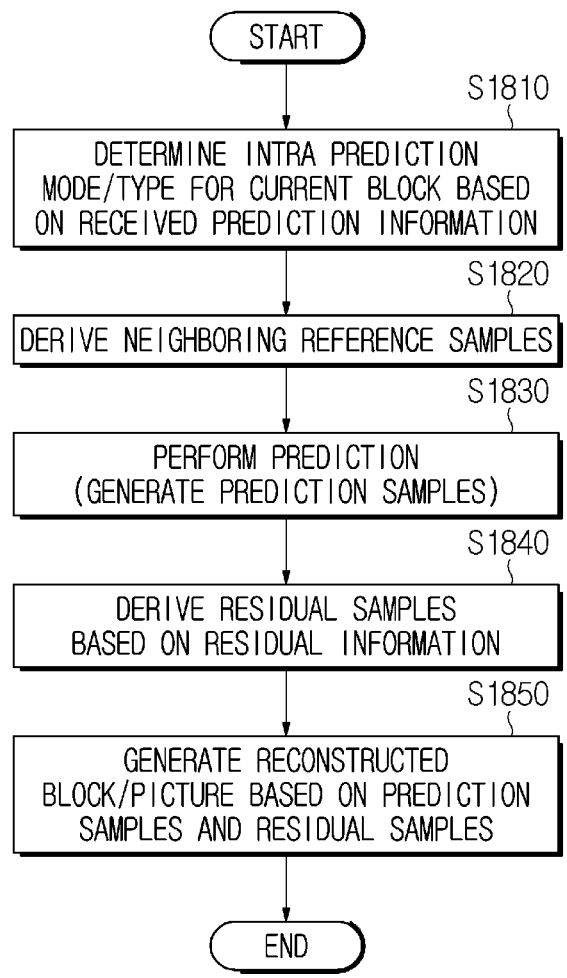

A description will be given with reference to FIG. 16. When intra prediction is applied to a current block 1601, neighboring reference samples to be used for intra prediction of the current block 1601 may be derived. The neighboring reference samples of the current block may include a total of 2×nh samples including samples 1611 adjacent to a left boundary of the current block having a size of nW×nH and samples 1612 adjacent to a bottom-left, a total of 2×nW samples including samples 1621 adjacent to a top boundary of the current block and samples 1622 adjacent to a top-right, and one sample 1631 adjacent to a top-left of the current block. Alternatively, the neighboring reference samples of the current block may include a plurality of columns of top neighboring samples and a plurality of rows of left neighboring samples.

In addition, the neighboring reference samples of the current block may include a total of nH samples 1641 adjacent to a right boundary of the current block having a size of nW×nH, a total of nW samples 1651 adjacent to a bottom boundary of the current block and one sample 1642 adjacent to a bottom-right of the current block.

However, some of the neighboring reference samples of the current block have not yet been decoded or may not be available. In this case, the decoding apparatus may construct neighboring reference samples to be used for prediction by substituting unavailable samples with available samples. Alternatively, neighboring reference samples to be used for prediction may be constructed through interpolation of available samples.

When neighboring reference samples are derived, (i) a prediction sample may be derived based on an average or interpolation of neighboring reference samples of the current block and (ii) the prediction sample may be derived based on a reference sample present in a specific (prediction) direction with respect to the prediction sample among the neighboring reference samples of the current block. The case of (i) may be referred to as a non-directional mode or a non-angular mode and the case of (ii) may be referred to as a directional mode or an angular mode. In addition, the prediction sample may be generated through interpolation between a first neighboring sample and a second neighboring sample located in a direction opposite to a prediction direction of an intra prediction mode of the current block based on the prediction sample of the current block among the neighboring reference samples. The above-described case may be referred to as a linear interpolation intra prediction (LIP). In addition, chroma prediction samples may be generated based on luma samples using a linear model. This case may be called an LM mode. In addition, a temporary prediction sample of the current block may be derived based on filtered neighboring reference samples, and the prediction sample of the current block may be derived by weighted-summing the temporary prediction sample and at least one reference sample derived according to the intra prediction mode among existing neighboring reference samples, that is, unfiltered neighboring reference samples. The above-described case may be called position dependent intra prediction (PDPC). In addition, a reference sample line with highest prediction accuracy may be selected from among multiple neighboring reference sample lines of the current block and the prediction sample may be derived using a reference sample located in a prediction direction on a corresponding line. At this time, intra prediction encoding may be performed by instructing (signaling) a used reference sample line to the decoding apparatus. The above-described case may be called multi-reference line (MRL) intra prediction or MRL based intra prediction. In addition, the current block may be partitioned into vertical or horizontal subpartitions, intra prediction may be performed based on the same intra prediction mode, and neighboring reference samples may be derived and used in units of subpartitions. That is, in this case, the intra prediction mode for the current block is equally applied to the subpartitions, and neighboring reference samples may be derived and used in units of subpartitions, thereby increasing intra prediction performance in some cases. Such a prediction method may be called intra sub-partitions (ISP) or ISP based intra prediction. Such intra prediction methods may be called an intra prediction type, in order to be distinguished from an intra prediction mode (e.g., DC mode, Planar mode or directional mode). The intra prediction type may be called various terms such as an intra prediction technique or an additional intra prediction mode. For example, the intra prediction type (or the additional intra prediction mode, etc.) may include at least one of the above-described LIP, PDPC, MRL, and ISP. A normal intra prediction method excluding specific intra prediction types such as LIP, PDPC, MRL and ISP may be called a normal intra prediction type. The normal intra prediction type may refer to a case where the specific intra prediction type is not applied, and prediction may be performed based on the above-described intra prediction mode. Meanwhile, post-filtering may be performed with respect to the derived prediction sample as necessary.

Specifically, an intra prediction procedure may include an intra prediction mode/type determination step, a neighboring reference sample derivation step and an intra prediction mode/type based prediction sample derivation step. In addition, post-filtering may be performed with respect to the derived prediction sample as necessary.

Meanwhile, in addition to the above-described intra prediction types, affine linear weighted intra prediction (ALWIP) may be used. ALWIP may be called linear weighted intra prediction (LWIP), matrix weighted intra prediction (MIP) or matrix based intra prediction. When MIP is applied to the current block, i) using neighboring reference samples subjected to an averaging procedure, ii) a matrix-vector-multiplication procedure may be performed and iii) a horizontal/vertical interpolation procedure may be further performed as necessary, thereby deriving the prediction samples for the current block. Intra prediction modes used for MIP may be constructed differently from intra prediction modes used in the above-described LIP, PDPC, MRL, ISP intra prediction or normal intra prediction. The intra prediction mode for MIP may be called a MIP intra prediction mode, a MIP prediction mode or a MIP mode. For example, a matrix and offset used in matrix-vector-multiplication may be differently set according to the intra prediction mode for MIP. Here, the matrix may be referred to as a (MIP) weight matrix, and the offset may be referred to as a (MIP) offset vector or a (MIP) bias vector. A detailed MIP method will be described below.

A block reconstruction procedure based on intra prediction and an intra prediction unit in the encoding apparatus may schematically include, for example, the following. S1710 may be performed by the intra prediction unit 185 of the encoding apparatus, and S1720 may be performed by a residual processor including at least one of the subtractor 115, the transformer 120, the quantizer 130, the dequantizer 140 and the inverse transformer 150 of the encoding apparatus. Specifically, S1720 may be performed by the subtractor 115 of the encoding apparatus. In S1730, prediction information may be derived by the intra prediction unit 185, and may be encoded by the entropy encoder 190. In S1730, residual information may be derived by a residual processor, and may be encoded by the entropy encoder 190. The residual information is information on residual samples. The residual information may include information on quantized transform coefficients for the residual samples. As described above, the residual samples may be derived as transform coefficients through the transformer 120 of the encoding apparatus, and the transform coefficients may be derived as quantized transform coefficients through the quantizer 130.

Information on the quantized transform coefficients may be encoded by the entropy encoder 190 through a residual coding procedure.

The encoding apparatus may perform intra prediction with respect to the current block (S1710). The encoding apparatus may derive an intra prediction mode/type for the current block, derive neighboring reference samples of the current block, and generate prediction samples in the current block based on the intra prediction mode/type and the neighboring reference samples. Here, a procedure for determining an intra prediction mode/type, a procedure for deriving neighboring reference samples and a procedure for generating prediction samples may be simultaneously performed, or any one procedure may be performed before another procedure. For example, although not shown, the intra prediction unit 185 of the encoding apparatus may include an intra prediction mode/type determination unit, a reference sample derivation unit, a prediction sample derivation unit. The intra prediction mode/type determination unit may determine the intra prediction mode/type for the current block, the reference sample derivation unit may derive neighboring reference samples of the current block, and the prediction sample derivation unit may derive the prediction samples of the current block. Meanwhile, when the below-described prediction sample filtering procedure is performed, the intra prediction unit 185 may further include a prediction sample filter. The encoding apparatus may determine a mode/type applied to the current block from among a plurality of intra prediction modes/types. The encoding apparatus may compare RD costs of the intra prediction modes/types and determine an optimal intra prediction mode/type for the current block.

Meanwhile, the encoding apparatus may perform a prediction sample filtering procedure. Prediction sample filtering may be referred to as post-filtering. Some or all of the prediction samples may be filtered by the prediction sample filtering procedure. In some cases, the prediction sample filtering procedure may be omitted.

The encoding apparatus may generate residual samples for the current block based on (filtered) prediction samples (S1720). The encoding apparatus may compare the prediction samples from the original samples of the current block based on a phase and derive the residual samples.

The encoding apparatus may encode image information including information on intra prediction (prediction information) and residual information of the residual samples (S1730). The prediction information may include the intra prediction mode information and the intra prediction type information. The encoding apparatus may output encoded image information in the form of a bitstream. The output bitstream may be transmitted to the decoding apparatus through a storage medium or a network.

The residual information may include a residual coding syntax described below. The encoding apparatus may transform/quantize the residual samples to derive quantized transform coefficients. The residual information may include information on the quantized transform coefficients.

Meanwhile, as described above, the encoding apparatus may generate a reconstructed picture (including reconstructed samples and a reconstructed block). To this end, the encoding apparatus may perform dequantization/inverse transform with respect to the quantized transform coefficients again to derive (modified) residual samples. The residual samples are transformed/quantized and then dequantized/inversely transformed in order to derive the same residual samples as the residual samples derived in the decoding apparatus as described above. The encoding apparatus may generate a reconstructed block including the reconstructed samples for the current block based on the prediction samples and the (modified) residual samples. A reconstructed picture for the current picture may be generated based on the reconstructed block. As described above, an in-loop filtering procedure is further applicable to the reconstructed picture.

The video/image decoding procedure based on intra prediction and the intra prediction unit in the decoding apparatus may schematically include the following, for example. The decoding apparatus may perform operation corresponding to operation performed in the encoding apparatus.

S1810 to S1830 may be performed by the intra prediction unit 265 of the decoding apparatus, and the prediction information of S1810 and the residual information of S1840 may be obtained from the bitstream by the entropy decoder 210 of the decoding apparatus. The residual processor including at least one of the dequantizer 220 and the inverse transformer 230 of the decoding apparatus may derive the residual samples for the current block based on the residual information. Specifically, the dequantizer 220 of the residual processor may perform dequantization based on quantized transform coefficients derived based on the residual information to derive transform coefficients and the dequantizer 220 of the residual processor may perform inverse transform with respect to the transform coefficients to derive the residual samples for the current block. S1850 may be performed by the adder 235 or the reconstructor of the decoding apparatus.

Specifically, the decoding apparatus may derive a intra prediction mode/type for the current block based on the received prediction information (intra prediction mode/type information) (S1810). The decoding apparatus may derive neighboring reference samples of the current block (S1820). The decoding apparatus may generate prediction samples in the current blocks based on the intra prediction mode/type and the neighboring reference samples (S1830). In this case, the decoding apparatus may perform a prediction sample filtering procedure. Prediction sample filtering may be referred to as post-filtering. Some or all of the prediction samples may be filtered by the prediction sample filtering procedure. In some cases, the prediction sample filtering procedure may be omitted.

The decoding apparatus may generate residual samples for the current block based on the received residual information. The decoding apparatus may generate reconstructed samples for the current block based on the prediction samples and the residual samples, and derive a reconstruction sample including the reconstructed samples (S1840). A reconstructed picture for the current picture may be generated based on the reconstructed block. As described above, the in-loop filtering procedure is further applicable to the reconstructed picture.

Here, although not shown, the intra prediction unit 265 of the decoding apparatus may include an intra prediction mode/type determination unit, a reference sample derivation unit and a prediction sample derivation unit, the intra prediction mode/type determination unit may determine the intra prediction mode/type for the current block based on the intra prediction mode/type information acquired by the entropy decoder 210, the reference sample derivation unit may derive the neighboring reference samples of the current block, and the prediction sample derivation unit may derive the prediction samples of the current block. Meanwhile, when the above-described prediction sample filtering procedure is performed, the intra prediction unit 265 may further include a prediction sample filter.

The intra prediction mode information may include flag information (e.g., intra_luma_mpm_flag) indicating whether a most probable mode (MPM) or a remaining mode is applied to the current block, and, when the MPM is applied to the current block, the prediction mode information may further include index information (e.g., intra_luma_mpm_idx) indicating one of intra prediction mode candidates (MPM candidates). The intra prediction mode candidates (MPM candidates) may be configured as an MPM candidate list or an MPM list. In addition, when the MPM is not applied to the current block, the intra prediction mode information may further include remaining mode information (e.g., intra_luma_mpm_remainder) indicating one of the remaining intra prediction modes excluding the intra prediction mode candidates (MPM candidates). The decoding apparatus may determine the intra prediction mode of the current block based on the intra prediction mode information. A separate MPM list may be configured for the above-described MIP.

In addition, the intra prediction type information may be implemented in various forms. For example, the intra prediction type information may include intra prediction type index information indicating one of the intra prediction types. As another example, the intra prediction type information may include at least one of reference sample line information (e.g., intra_luma_ref_idx)) indicating whether the MRL is applied to the current block and which reference sample line is used if applied, ISP flag information (e.g., intra_subpartitions_mode_flag) indicating whether the ISP is applied to the current block, ISP type information (e.g., intra_subpartitions_split_flag) indicating the split type of subpartitions when the ISP is applied, flag information indicating whether PDCP is applied or flag information indicating whether LIP is applied. In addition, the intra prediction type information may include an MIP flag indicating whether MIP is applied to the current block.

The intra prediction mode information and/or the intra prediction type information may be encoded/decoded through the coding method described in the present disclosure. For example, the intra prediction mode information and/or the intra prediction type information may be encoded/decoded through entropy coding (e.g., CABAC or CAVLC) based on truncated (rice) binary code.

Residual Processing

Hereinafter, a residual processing method performed by the above-described encoding apparatus and/or decoding apparatus will be described. The residual processing procedure performed by the encoding apparatus may include a procedure for generating and/or coding (encoding) residual information from residual samples for a derived current block. The residual processing procedure may further include a procedure for deriving the residual samples based on the prediction samples. The residual processing procedure performed by the decoding apparatus may include a procedure for deriving residual samples from residual information of a bitstream received from the encoding apparatus. For example, the residual processing procedure may include an (inverse) transform and/or a (de)quantization procedure. In addition, the residual processing procedure may include a coding/decoding (encoding/decoding) procedure of residual information. The residual information may include residual data and/or transform/quantization related parameters.

Hereinafter, a method of deriving (quantized) transform coefficients in a block, generating and (en)coding residual information based on this and a method of deriving (quantized) residual coefficients in a block, to which transform skip applies, and generating and (en)coding residual information for transform skip based on this will be described. The encoded information may be output in the form of a bitstream as described above.

In addition, a method of deriving (quantized) transform coefficient in a block or (quantized) residual coefficients from residual information (or residual information for transform skip) included in the bitstream and performing dequantization/inverse transform (as necessary) to derive residual samples will be described.

Figure 19:
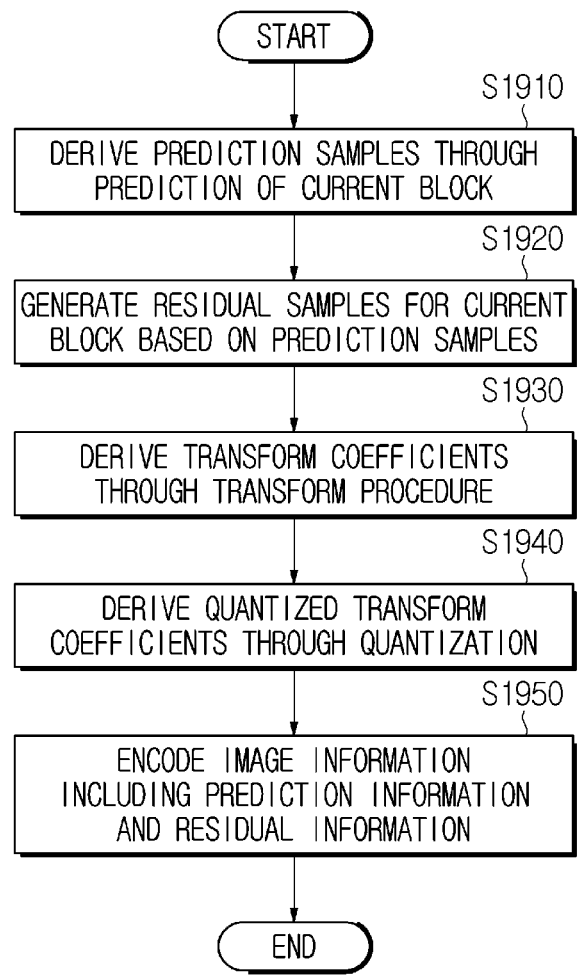
FIGS. 19 to 20 are views illustrating a residual processing method according to an embodiment.
Figure 20:
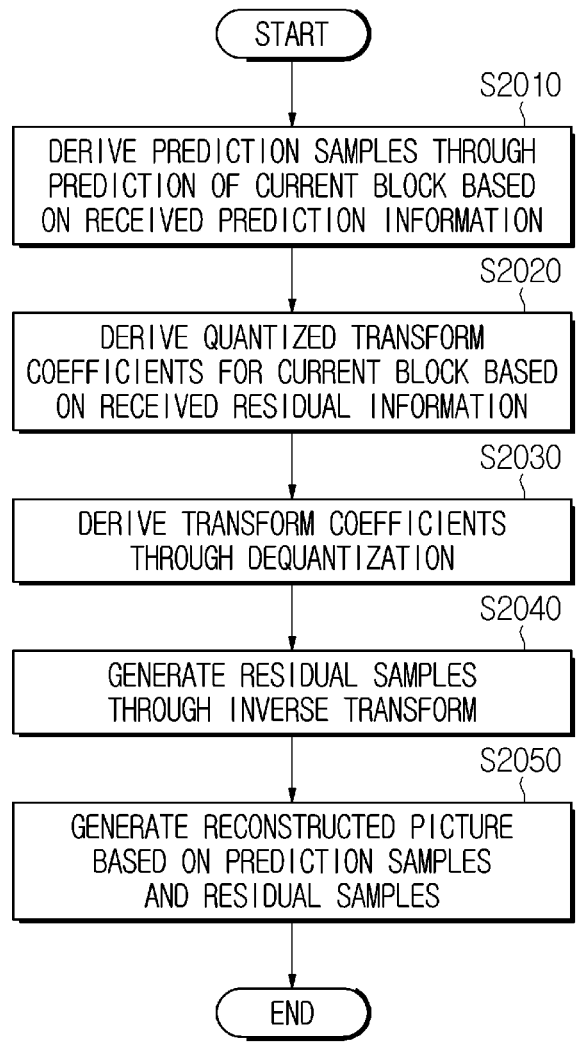

FIGS. 19 to 20 are views illustrating a residual processing method according to an embodiment. Each step shown in FIG. 19 may be performed by the encoding apparatus. For example, S1910 may be performed by the inter prediction unit 180 or the intra prediction unit 185 of the encoding apparatus 100, and S1920, S1930, S1940 and S1950 may be respectively performed by the subtractor 115, the transformer 120, the quantizer 130 and the entropy encoder 190 of the encoding apparatus 100.

The encoding apparatus may derive prediction samples through prediction of the current block (S1910). The encoding apparatus may determine whether inter prediction or intra prediction is performed on the current block and a specific inter prediction mode or a specific intra prediction mode may be determined based on RD cost. According to the determined mode, the encoding apparatus may derive prediction samples for the current block.

Next, the encoding apparatus may generate residual samples for the current block based on the prediction samples (S1920). For example, the encoding apparatus may compare original samples for the current block with the prediction samples to derive residual samples.

Next, the encoding apparatus may derive transform coefficients through a transform procedure for the residual samples (S1930). and quantize the derived transform coefficients to derive quantized transform coefficients (S1940). Here, quantization may be performed based on a quantization parameter. In addition, in some embodiments, the transform procedure and/or the quantization procedure may be omitted. When the transform procedure is omitted, a (quantized) (residual) coefficient for the residual samples may be coded according to a residual coding method described below. The (quantized) residual coefficient may also be called a (quantized) transform coefficient, for the sake of unification of terms.

The encoding apparatus may encode image information including prediction information and residual information and output the encoded image information in the form of a bitstream (S1950). The prediction information may include prediction mode information and motion information (e.g., when inter prediction applies) as information related to the prediction procedure. The residual information may include information on the (quantized) transform coefficients, and may include, for example, information disclosed in residual coding syntax residual_coding( ) or information disclosed in transform skip residual coding syntax residual_ts_coding( ) described below. The output bitstream may be transmitted to the encoding apparatus through a storage medium or a network.

In addition, each step shown in FIG. 20 may be performed by the decoding apparatus. For example, S2010 may be performed by the inter prediction unit 260 or intra prediction unit 265 of the encoding apparatus 200. In S2010, a procedure for deriving values of a syntax element by decoding prediction information included in the bitstream may be performed by the entropy decoder 210 of the encoding apparatus 200. S2020, S2030, S2040 and S2050 may be respectively performed by the entropy decoder 210, dequantizer 220, inverse transformer 230 and adder 235 of the encoding apparatus 200.

The encoding apparatus may perform operation corresponding to operation performed by the encoding apparatus. The encoding apparatus may perform inter prediction or intra prediction on a current block based on the received prediction information and derive prediction samples (S2010). The encoding apparatus may derive quantized transform coefficients for the current block based on the received residual information (S2020). The encoding apparatus may derive the quantized transform coefficients from the residual information through entropy decoding. Dequantization may be performed based on a quantization parameter. The encoding apparatus may derive transform coefficients by dequantizing the quantized transform coefficients (S2030). The encoding apparatus may derive residual samples through an inverse transform procedure for the transform coefficients (S2040). The inverse transform procedure and/or the dequantization procedure may be omitted. When the inverse transform procedure is omitted, (quantized)(residual) coefficients may be derived from the residual information, and residual samples may be derived based on the (quantized) (residual) coefficients. Next, the decoding apparatus may generate a reconstructed picture based on the prediction samples and the residual samples (S2050). For example, the encoding apparatus may generate reconstructed samples for the current block based on the prediction samples and the residual samples and generate a reconstructed picture based on this. Thereafter, an in-loop filtering procedure may further apply to the reconstructed picture, as described above.

Residual Coding

As described above, residual samples are subjected to a transform and quantization process to derive quantized transform coefficients. In this case, the quantized transform coefficients may be called transform coefficients. In this case, transform coefficients in a block may be signaled in the form of residual information. The residual information may include residual coding syntax. That is, the encoding apparatus may construct residual coding syntax as residual information and encode and output it in the form of a bitstream, the encoding apparatus may decode the residual coding syntax from the bitstream to derive residual (quantized) transform coefficients. The residual coding syntax may include syntax elements specifying the position of the last significant transform coefficient in the corresponding block, whether a significant transform coefficient is present in a subblock and the size/sign of the significant transform coefficient.

For example, the transform coefficients of VVC may be coded using last_sig_coeff_x_prefix, last_sig_coeff_y_prefix, last_sig_coeff_x_suffix, last_sig_coeff_y_suffix, coded_sub_block_flag, sig_coeff_flag, abs_level_gtX_flag[n][0], par_level_flag, abs_level_gtX_flag[n][1], abs_remainder, dec_abs_level, and coeff_sign_flag syntax elements. This may be called residual (data) coding or (transform) coefficient coding. In addition, a residual coding process including the transform and quantization process may be referred to as a regular residual coding pass, which may be specified as residual_coiding( ) syntax of FIGS. 21 to 27.

Meanwhile, the transform/quantization process will be omitted. In this case, values of residual samples may be coded and signaled according to a predetermined method. A residual coding process, from which the transform and/or quantization process is omitted, may be referred to as a transform skip residual coding pass, which may be specified as residual_ts_coding( ) syntax of FIGS. 29 to 31.

Regular Residual Coding Pass

Hereinafter, a transform coefficient signaling method when a regular residual coding pass applies will be described in greater detail with reference to the syntax of FIGS. 21 to 27. FIGS. 21 to 27 show syntax elements related to residual data coding.

Hereinafter, the syntax elements described in the syntax of FIGS. 21 to 27 will be briefly described. The names of the syntax elements described below are examples and the scope of the present disclosure is not limited by the names of the syntax elements.

An array AbsLevel[xC][yC] may represent an array consisting of an absolute value of a transform coefficient level for a current transform block.

An array AbsLevelPass1[xC][yC] may represent an array consisting of a value representing a portion of an absolute value of a transform coefficient level for a current transform block.

Array indices xC and yC may represent transform coefficient positions (xC, yC) in the current transform block. When the value of AbsLevel[xC][yC] is not provided through the syntax of FIGS. 21 to 27, the value thereof may be derived as 0. In addition, even when the value of AbsLevelPass1[xC][yC] is not provided through the syntax of FIGS. 21 to 27, the value thereof may be derived as 0.

A variable CoeffMin specifying a minimum transform coefficient value and a variable CoeffMax specifying a maximum transform coefficient value may be derived as shown in the following equation.

$$CoeffMin=-(1\ll 15)$$

$$CoeffMax=(1\ll 15)-1 \quad \text{[Equation 1]}$$

An array QStateTransTable[ ] [ ] may be defined as follows.

$$QStateTransTable[\ ][\ ]=\{\{0,2\},\{2,0\},\{1,3\},\{3,1\}\} \quad \text{[Equation 2]}$$

Syntax elements last_sig_coeff_x_prefix, last_sig_coeff_y_prefix, last_sig_coeff_x_suffix and last_sig_coeff_y_suffix may specify the position of the last significant coefficient identified according to the scan order of samples in the transform block among coefficients in the transform block. A significant coefficient may have a non-zero value.

More specifically, last_sig_coeff_x_prefix may specify a prefix of a column position of the last significant coefficient. last_sig_coeff_x_prefix may have a value of 0 to (log 2ZoTbWidth≪1)−1. Here, the value of log 2ZoTbWidth may be determined according to the syntax of FIG. 21. When the value of last_sig_coeff_x_prefix is not obtained from the bitstream, the value thereof may be determined to be 0.

last_sig_coeff_y_prefix may specify a prefix of a row position of the last significant coefficient. last_sig_coeff_y_prefix may have a value of 0 to (log 2ZoTbHeight≪1)−1. Here, the value of log 2ZoTbHeight may be determined according to the syntax of FIG. 21. When the value of last_sig_coeff_y_prefix is not obtained from the bitstream, the value thereof may be determined to be 0.

last_sig_coeff_x_suffix may specify a suffix of a column position of the last significant coefficient. last_sig_coeff_x_suffix may have a value of 0 to (1≪((last_sig_coeff_x_prefix≫1)−1))−1.

A variable LastSignificantCoeffX specifying a column position of the last significant coefficient according to the scan order in the transform block may be derived as follows.

When the value of last_sig_coeff_x_suffix is not present, LastSignificantCoeffX may be determined as shown in the following equation.

$$\text{LastSignificantCoeffX} = \text{last\_sig\_coeff\_x\_prefix} \quad \text{[Equation 3]}$$

Otherwise, when the value of last_sig_coeff_x_suffix is present, the value of LastSignificantCoeffX may be determined as shown in the following equation.

$$\text{LastSignificantCoeffX} = (1 \ll ((\text{last\_sig\_coeff\_x\_prefix} \gg 1) - 1)) * (2 + (\text{last\_sig\_coeff\_x\_prefix} \& 1)) + \text{last\_sig\_coeff\_x\_suffix} \quad \text{[Equation 4]}$$

last_sig_coeff_y_suffix may specify a suffix of a row position of the last significant coefficient. last_sig_coeff_y_suffix may have a value of 0 to $(1 \ll ((\text{last\_sig\_coeff\_y\_prefix} \gg 1) - 1)) - 1$.

A variable LastSignificantCoeffY specifying a row position of the last significant coefficient according to the scan order in the transform block may be derived as follows.

When the value of last_sig_coeff_y_suffix is not present, LastSignificantCoeffY may be determined as shown in the following equation.

$$\text{LastSignificantCoeffY} = \text{last\_sig\_coeff\_y\_prefix} \quad \text{[Equation 5]}$$

Otherwise, when the value of last_sig_coeff_y_suffix is present, the value of LastSignificantCoeffY may be determined as shown in the following equation.

$$\text{LastSignificantCoeffY} = (1 \ll ((\text{last\_sig\_coeff\_y\_prefix} \gg 1) - 1)) * (2 + (\text{last\_sig\_coeff\_y\_prefix} \& 1)) + \text{last\_sig\_coeff\_y\_suffix} \quad \text{[Equation 6]}$$

where, the scan order may be one of an upper-right diagonal scan order, a lower-left diagonal scan order, a horizontal scan order and a vertical scan order. In this case, the horizontal scan order may mean a scan order from left to right, and the vertical scan order may mean a scan order from the top to the bottom. The scan order may be determined based on whether intra/inter prediction applies to a target block and/or a specific intra/inter prediction mode.

A syntax coded_sub_block_flag[xS, yS] may specify the following information for a subblock present at a (xS, yS) position in the current transform block. Here, the subblock may be a 4×4 array consisting of 16 transform coefficient levels. For example, a first value (e.g., 0) of coded_sub_block_flag may specify that 16 transform coefficient levels of a subblock at a (xS, yS) position is derived as 0.

A second value (e.g., 1) of coded_sub_block_flag may specify information according to the following condition. For example, when (xS, yS) is (0, 0) and (LastSignificantCoeffX, LastSignificantCoeffY) is not (0, 0), a second value (e.g., 1) of coded_sub_block_flag may specify that at least one of 16 sig_coeff_flag syntax elements is provided for a subblock at a (xS, yS) position. Otherwise, a second value (e.g., 1) of coded_sub_block_flag may specify that at least one of 16 sig_coeff_flag has a non-zero value for the subblock at the (xS, yS) position.

Meanwhile, when the value of coded_sub_block_flag[xS, yS] is not provided from the bitstream, the value thereof may be derived as a second value (e.g., 1).

A syntax element sig_coeff_flag[xC, yC] may specify whether a transform coefficient level corresponding to a position (xC, yC) has a non-zero value, for the transform coefficient position (xC, yC) in the current transform block. For example, a first value (e.g., 0) of sig_coeff_flag[xC][yC] may specify that the transform coefficient level at the position (xC, yC) is 0. Accordingly, the corresponding transform coefficient level may be set to 0. Meanwhile, a second value (e.g., 1) of sig_coeff_flag[xC][yC] may specify that the transform coefficient level at the position (xC, yC) has a non-zero value.

When sig_coeff_flag[xC, yC] is not provided from the bitstream, this may be derived as follows. When the position (xC, yC) is a last significant coefficient position (e.g., LastSignificantCoeffX, LastSignificantCoeffY) in the scan order or when all Conditions 1 to 3 below are true, the value of sig_coeff_flag[xC, yX] may be derived as a second value (e.g., 1). Otherwise, the value of sig_coeff_flag[xC, yX] may be derived as a first value (e.g., 0).

(Condition 1) The value of (xC & ((1 << log 2SbW)-1), yC & ((1 << log 2SbH)-1)) is (0, 0)

(Condition 2) The value of inferSbDcSigCoeffFlag is 1

(Condition 3) The value of coded_sub_block_flag[xS][yS] is 1

A syntax element abs_level_gtx_flag[n][j] may specify that an absolute value of a transform coefficient level at a scan position n is greater than (j<<1)+1. For example, a first value (e.g., 0) of abs_level_gtx_flag[n][j] may specify that the absolute value of the transform coefficient level at the scan position n is not greater than (j<<1)+1. A second value (e.g., 1) of abs_level_gtx_flag[n][j] may specify that the absolute value of the transform coefficient level at the scan position n is greater than (j<<1)+1. When abs_level_gtx_flag[n][j] is not provided from the bitstream, it may be derived as a first value (e.g., 0).

A syntax element par_level_flag[n] may specify a parity of a transform coefficient level at a scan position n. When par_level_flag[n] is not provided from the bitstream, the value thereof may be derived as 0.

A syntax element abs_remainder[n] may specify a residual absolute value of a transform coefficient level coded with Golomb-Rice code at the scan position n. When abs_remainder[n] is not provided from the bitstream, the value thereof may be derived as 0.

Meanwhile, for bit conformance, the value of abs_remainder[n] may be limited such that the value of TransCoeffLevel[x0][y0][cIdx][xC][yC] corresponding thereto has a value between CoeffMin and CoeffMax.

A syntax element dec_abs_level[n] may specify an intermediate value coded with the Golomb-Rice code at the scan position n. Using dec_abs_level[n] and a predetermined parameter ZeroPos[n], the absolute value AbsLevel[xC][yC] of the transform coefficient level at the (xC, yC) position may be derived as follows. For example, when the value of dec_abs_level[n] is equal to ZeroPos[n], the value of AbsLevel[xC][yC] may be set to 0. Meanwhile, when the value of dec_abs_level[n] is less than ZeroPos[n], the value of AbsLevel[xC][yC] may be set to dec_abs_level[n]+1. Meanwhile, when the value of dec_abs_level[n] is greater than ZeroPos[n], the value of AbsLevel[xC][yC] may be set to dec_abs_level[n]. Here, ZeroPos[n] may be determined during an encoding process, and may be signaled through the bitstream.

Therefore, the value of AbsLevelPass1[xC][yC] may be derived as shown in the following equation.

$$\text{AbsLevelPass1}[xC][yC] = \text{Min}(4 + (\text{AbsLevel}[xC][yC] \& 1), \text{AbsLevel}[xC][yC]) \quad \text{[Equation 7]}$$

For bitstream conformance, the value of dec_abs_level[n] may be limited such that the value of TransCoeffLevel[x0][y0][cIdx][xC][yC] corresponding thereto has a value between CoeffMin and CoeffMax.

A syntax element coeff_sign_flag[n] may specify the sign of the transform coefficient level at the scan position n as follows. For example, when the value of coeff_sign_flag[n]

is a first value (e.g., 0), the corresponding transform coefficient level may have a positive sign.

Otherwise, when the value of coeff_sign_flag[n] is a second value (e.g., 1), the corresponding transform coefficient level may have a negative sign.

Meanwhile, when the value of coeff_sign_flag[n] is not provided, the value thereof may be derived as a first value (e.g., 0).

According to the above, the value of CoeffSignLevel[xC][yC] specifying the sign of the transform coefficient level at the position (xC, yC) may be derived as follows. For example, when the value of CoeffSignLevel[xC][yC] is 0, the corresponding transform coefficient level may be set to 0.

Otherwise, when the value of CoeffSignLevel[xC][yC] is 1, the corresponding transform coefficient level may be set to a positive value.

Otherwise, when the value of CoeffSignLevel[xC][yC] is −1, the corresponding transform coefficient level may be set to a negative value.

A method of performing regular residual coding by the encoding apparatus using the above-described syntax element will be described. As described above, syntax elements last_sig_coeff_x_prefix, last_sig_coeff_y_prefix, last_sig_coeff_x_suffix and last_sig_coeff_y_suffix are syntax elements for encoding (x, y) position information of a last non-zero coefficient in an associated block. In this case, the associated block may be a coding block (CB) or a transform block (TB). Regarding the transform (quantization) and residual coding procedure, the CB and the TB may be used interchangeably For example, residual samples may be derived for the CB, (quantized) transform coefficient may be derived through transform and quantization for the residual samples, as described above, and information (or syntax elements) efficiently specifying (the positions, size, signs, etc. of) the (quantized) transform coefficients may be generated and signaled through a residual coding procedure. The quantized transform coefficients may be simply referred to as transform coefficients. In general, when the CB is not greater than a maximum TB, the size of the CB may be equal to that of the TB, and, in this case, a target block to be transformed (and quantized) and residual-coded may be referred to as a TB. Although, hereinafter, syntax elements related to residual coding is described as being signaled in units of transform blocks (TBs), this is an example and the TB is used interchangeably with the coding block (CB), as described above.

Specifically, last_sig_coeff_x_prefix may specify a prefix of a column position of a last significant coefficient in the scanning order in the transform block, and last_sig_coeff_y_prefix may specify a prefix of a row position of a last significant coefficient in the scanning order in the transform block. last_sig_coeff_x_suffix may specify a suffix of a column position of a last significant coefficient in the scanning order in the transform block, and last_sig_coeff_y_suffix may specify a suffix of a row position of a last significant coefficient in the scanning order in the transform block. Here, the significant coefficient may mean a non-zero coefficient. The scanning order may be an upper-right diagonal scanning order. Alternatively, the scanning order may be one of a lower-left diagonal scanning order, a horizontal scanning order and a vertical scanning order. In this case, the horizontal scanning order may mean a scanning order from left to right, and the vertical scanning order may mean a scan order from the top to the bottom. The scanning order may be determined based on whether intra/inter prediction applies to a target block (a CB or a CB including a TB) and/or a specific intra/inter prediction mode. Using this, the encoding apparatus may encode the last significant coefficient position.

Next, the encoding apparatus may represent whether a non-zero coefficient is present in a current lower-layer block using a 1-bit syntax element coded_sub_block_flag for each 4×4 lower-layer block, after splitting a transform bock into 4×4 subblocks. In this case, the subblock may be referred to as a coefficient group (CG).

When the value of coded_sub_block_flag is 0, since there is no more information to be transmitted, the encoding process of the subblock may be finished. Conversely, when the value of coded_sub_block_flag is 1, the encoding process of sig_coeff_flag may be performed. According to the scanning order, encoding of coded_sub_block_flag may not be performed for a subblock including a last non-zero coefficient. In addition, since a subblock including DC information of a transform block has a high probability of including a non-zero coefficient, coded_sub_block_flag is not encoded and the value thereof may be set to 1.

When coded_sub_block_flag specifies that a non-zero coefficient is present in the current subblock, sig_coeff_flag having a binary value may be coded according to an inversely scanned order. A 1-bit syntax element sig_coeff_flag [n] may be encoded for each coefficient at the corresponding scanning position n according to the scanning order. When the value of the coefficient at the current scan position is not 0, the value of sig_coeff_flag[n] may be 1. Here, in case of a subblock including a last non-zero coefficient, since sig_coeff_flag[n] does not need to be encoded for the last non-zero coefficient, the encoding process may be omitted. Only when sig_coeff_flag[n] is 1, level information encoding may be performed. In this case, the level information encoding/decoding process may be performed using at least one of the above-described syntax elements. Meanwhile, a syntax element sig_coeff_flag[xC][yC] may specify whether the level (value) of the corresponding transform coefficient at each transform coefficient position (xC, yC) in a current TB is 0.

The remaining level value after sig_coeff_flag[n] encoding may be derived according to the following equation.

$$\text{remAbsLevel}[n]=|\text{coeff}[n]|-1 \qquad [\text{Equation 8}]$$

In this case, a syntax element remAbsLevel[n] may specify a level value to be encoded at the scan position n. coeff[n] may mean an actual transform coefficient value.

A syntax element abs_level_gtX_flag[n][0] may specify whether remAbsLevel[n] at the scan position n is greater than 1. When the value of abs_level_gtX_flag[n][0] is 0, the absolute value of the corresponding position coefficient may be 1. In contrast, when the value of abs_level_gtX_flag[n][0] is 1, remAbsLevel[n] may be derived according to the following equation.

$$\text{remAbsLevel}[n]=\text{remAbsLevel}[n]-1 \qquad [\text{Equation 9}]$$

Using par_level_flag[n], a least significant coefficient (LSB) value of remAbsLevel[n] may be encoded according to the following equation. That is, par_level_flag[n] may specify a parity of a transform coefficient level (value) at the scan position n. A level value remAbsLevel[n] to be encoded after encoding par_level_flag[n] may be updated according to the following equation.

$$\text{par\_level\_flag}[n]=\text{remAbsLevel}[n]\&1$$

$$\text{remAbsLevel}[n]=\text{remAbsLevel}[n]\gg 1 \qquad [\text{Equation 10}]$$

A syntax element abs_level_gtX_flag [n][1] may specify whether remAbsLevel[n] at the scan position n is greater than 3. For example, only when abs_level_gtX_flag[n][1] is 1, abs_remainder[n] may be encoded. For example, a relationship between coeff[n] and each syntax element may be shown in the following equation. In this case, |coeff[n]| may specify a transform coefficient level (value) and may be expressed as AbsLevel[n] for a transform coefficient. A syntax element coeff_sign_flag[n] may specify a transform coefficient sign at the corresponding scan position n Summarizing the above, abs_level_gtx_flag[n][i] may be a syntax element specifying whether the absolute value of the transform coefficient is greater than any one of 1 or 3.

$$|coeff[n]|=sig\_coeff\_flag[n]+abs\_level\_gtX\_flag[n][0]+par\_level\_flag[n]+2*(abs\_level\_gtX\_flag[n][1]+abs\_remainder[n]) \quad \text{[Equation 11]}$$

Finally, the sign of each coefficient may be encoded using coeff_sign_flag[n] which is a 1-bit symbol. coeff_sign_flag [n] may specify the sign of the transform coefficient level at the corresponding scan position n.

Meanwhile, CABAC provides high performance, but has a disadvantage that throughput performance is not good. This may be due to a regular encoding engine of the above-described CABAC. The regular encoding engine uses a probability state and range updated through encoding of a previous bin and thus has high data dependency and has a problem that it takes a considerable time to read a probability interval and to determine a current state. In this case, when the number of context coding bins is limited, the throughput problem of CABAC may be solved.

For example, a sum of bins used to express sig_coeff_flag [n], abs_level_gtX_flag[n][0], par_level_flag [n] and abs_level_gtx_flag [n][1] may be limited according to the size of the transform block. Specifically, the sum of bins may be limited to a value of ((1«(log 2TbWidth+log 2Tb Height))*7)»2. The sum of bins may be limited to a number of 1.75 times the size of the transform block including a current CG, which may mean that 1.75 context coding bins may be used per one pixel position on average. When all limited context coding bins are used to encode the syntax element, CABAC does not apply to the remaining coefficients and bypass encoding may be performed. That is, when the number of encoded context coding bins is TU width*TU height*1.75 in the TU, sig_coeff_flag[n], abs_level_gtX_ flag [n][0], par_level_flag [n] and abs_level_ gtX_flag [n] [1] which are encoded with the context coding bin may be no longer additionally encoded. In this case, |coeff[n]| may be encoded into dec_abs_level[n] as shown in the following equation. Even in this case, the sign of each coefficient may be encoded using coeff_sign_flag[n] which is a 1-bit symbol.

$$|coeff[n]|=dec\_abs\_level[n] \quad \text{[Equation 12]}$$

Transform Skip Residual Coding Pass

Hereinafter, a transform coefficient signaling method when transform skip residual coding pass applies will be described in greater detail with reference to the syntax of FIGS. 28 to 31. FIG. 28 shows syntax in a transform unit specifying signaling of a transform skip flag transform_ skip_flag, and FIGS. 29 to 31 show syntax in transform skip residual coding pass.

Hereinafter, a transform skip flag signaling method will be first described with reference to FIG. 28. As described above, the transformer 120 of the image encoding apparatus may generate transform coefficients by performing transform with respect to a residual signal. The transform coefficients may be signaled to the image decoding apparatus through quantization and entropy encoding, and the inverse transformer 230 of the image decoding apparatus may reconstruct transform coefficients by performing inverse transform with respect to the transform coefficient. The image encoding apparatus may perform entropy encoding without performing transform with respect to the residual signal, in a special case, and such operation of the image encoding apparatus may be defined as transform skip process or transform skip mode application. For the residual signal, from which transform is omitted, the inverse transformer 230 of the image decoding apparatus may not perform inverse transform.

The image encoding apparatus may transmit information specifying whether a transform skip mode applies to a current block. For example, the image encoding apparatus may signal whether the transform skip mode applies to the current block through a syntax element transform_skip_flag. transform_skip_flag[x0][y0] may specify whether transform applies to a luma transform block. Here, x0 and y0 may specify the position (x0, y0) of the top-left luma sample of the current transform block for the top-left sample position of a current picture. A first value (e.g., 0) of transform_skip_ flag[x0][y0] may specify that whether transform applies to the luma transform block is determined based on the value of another syntax element. A second value (e.g., 1) of transform_skip_flag[x0][y0] may specify that transform does not apply to the luma transform block. Meanwhile, when the value of transform_skip_flag[x0][y0] is not provided from the bitstream, the value thereof may be derived as follows. For example, when the value of BdpcmFlag[x0] [y0] is a first value (e.g., 0), the value of transform_skip_flag [x0][y0] may be determined to be a first value (e.g., 0). Otherwise, when the value of BdpcmFlag[x0][y0] is a second value (e.g., 1), the value of transform_skip_flag[x0] [y0] may be determined to be a second value (e.g., 1). BdpcmFlag will be described later.

transform_skip_flag may be signaled based on at least one of the height, width or maximum transform size of the current block. For example, whether to encode/decode transform_skip_flag of the current block may be determined according to the condition of the following equation.

$$\text{transform\_skip\_enabled\_flag \&\&!BdpcmFlag}[x0][y0]\&\&\text{TbWidth}\leq\text{MaxTsSize \&\& TbHeight}\leq\text{MaxTsSize} \quad \text{[Equation 13]}$$

In this case, transform_skip_enabled_flag may be a syntax element specifying whether a transform skip mode is applicable, and may be signaled at at least one of a sequence level, a picture level, a tile level, a tile group level or a slice level. For example, when transform_skip_enabled_flag is signaled at a sequence level, transform_skip_enabled_flag may be named sps_transform_skip_enabled_flag as shown in FIG. 28.

As described above, an embodiment of a bitstream structure when a transform skip mode applies is shown in FIGS. 29 to 31. FIGS. 29 to 31 show an embodiment of residual coding pass residual_ts_coding( ) for signaling a transform coefficient when a transform skip mode applies to a current block.

When the transform skip mode applies to the current block, encoding/decoding of the above-described residual signal may be performed according to the following features compared to the case where transform applies.

When the transform skip mode applies, since a spatial residual is reflected after a residual signal is predicted and energy compression is not performed by transform, insignificant levels or consecutive values of 0 are unlikely to appear at the bottom-right corner of the transform block. Therefore, signaling of the last significant scan position may not be required. Accordingly, when transform skip applies, signaling of the last significant scanning position may be omitted. Instead, a subblock located at the rightmost side of the transform block may be selected as a first subblock on which encoding or decoding is performed.

As the last significant scan position is not signaled, when transform skip is performed, signaling of whether the subblock is encoded using coded_sub_block_flag may be modified. For example, the last significant scan position may be removed. In addition, coded_block_flag may be encoded for all subblocks. When all the values of coded_sub_block_flag are not 0, coded_sub_block_flag of the DC subblock may also be signaled.

In this case, coded_sub_block_flag of the DC subblock may be derived as 1 without being signaled (inferDcSbCbf=1). In this case, as at least one of significant level value is present in the DC subblock, if all the values of different sig_coeff_flag syntax elements present in the DC subblock are equal to 0, a sig_coeff_flag syntax element for a top-left position (0, 0) may be derived as 1 (inferSbDcSigCoeffFlag=1) without being signaled.

In addition, context modeling for coded_sub_block_flag may also be modified. A context model index may be calculated by a sum or logical sum of coded_sub_block_flag of a right and lower neighboring block of a current subblock.

In addition, in sig_coeff_flag[ ] context modeling, a local template at sig_coeff_flag may be modified to include only the right neighboring block $NB_0$ and the lower neighboring block $NB_1$ at the current scan position. A context model offset may be determined to be the number of significant neighboring positions, and may be calculated by sig_coeff_flag[$NB_0$]+sig_coeff_flag[$NB_1$]. Accordingly, selection of different context sets following a diagonal line d in the current transform block may be removed. As a result, three context models and a single context model set for encoding a sig_coeff_flag flag may be generated.

In addition, regarding context modeling of abs_level_gtX_flag[ ][0] and par_level_flag[ ], a single context model for abs_level_gtX_flag and par_level_flag may be employed.

In addition, with respect to abs_remainder[ ] encoding, empirical distribution of transform-skipped residual absolute values generally corresponds to Laplacian or geometric distribution, but is shown to have greater instationarity than the absolute value of the transformed coefficient. Therefore, abs_remainder syntax binarization and context modeling may be modified as follows.

In an embodiment, a high cutoff value may be used during binarization. For example, dedicated context models for a transition point and each bin position in encoding using sig_coeff_flag, abs_level_gtX_flag and par_level_flag for the Rice code of Abs_remainder enable higher compression efficiency to be calculated. By increasing the cutoff, a higher "greater than X" flag may be used. For example, "greater than X" flags such as abs_level_gtX_flag[ ][2], abs_level_gtX_flag[ ][3], . . . , abs_level_gtX_flag[ ][n] may be used, where n may be an integer of 9 or greater than 9. In an embodiment, n may be 5. In an embodiment, the value of abs_level_gtX_flag[ ][n] may be determined to be (n«1)+1. For example, abs_level_gtX_flag[ ][2] may be determined to be 5, abs_level_gtX_flag[ ][3] may be determined to be 7, abs_level_gtX_flag[ ][4] may be determined to be 9, and abs_level_gtX_flag[ ][n] may be determined to be 2n+1.

In addition, a template for deriving the Rice parameter may be modified. For example, only the left and lower neighbors of the current scan position may be referenced as in the above-described sig_coeff_flag context modeling.

In addition, regarding coeff_sign_flag context modeling, based on instationarity in the sequence of signs and the fact that predicted residual is often biased, the sign may be encoded using a context model. A single dedicated context model may be used to encode the sign, and the sign may be parsed after sig_coeff_flag in order to collect context coding bins together. In addition, with respect to reduction of the context coding bin, the context coding bin when transform is skipped may be limited to 2 per pixel at a TU level. For each syntax element which is context-coded, a CCB (context coded bins) counter MaxCcbs may be reduced. When the number of CCBs reaches a maximum bin or when the CCB counter reaches 0 (e.g., TU width*TU height*2), all syntax elements may be encoded like EP.

In addition, with respect to forward coefficient scanning, the scanning order of the subblock and the coefficient of the subblock may be from a top-left coefficient to a bottom-right position according to the diagonal scanning order.

Regarding level mapping, when BDPCM does not apply to a current CU, by mapping absCoeffLevel which is an absolute level (value) to a modified level (value), encoding may be performed using the following method based on the value of the quantized residual sample located at the left and upper side of a current residual sample. For example, when X0 means an absolute coefficient level (value) located at the left of the current coefficient and X1 means an absolute coefficient level (value) located at the upper side, in order to express a coefficient having an absolute coefficient level (value) absCoeff, mapped absCoeffMod may be encoded using the following method.

[Equation 14]
pred = max(X0, X1);
if (absCoeff == pred)
{
absCoeffMod = 1;
}
else
{
absCoeffMod = (absCoeff < pred) ? absCoeff + 1 : absCoeff;
}

In addition, context derivation for abs_level_gt1_flag may be performed using a method of using information on the above-described upper neighboring coefficient and the left neighboring coefficient. When BDPCM does not apply to the current CU, a context offset (e.g., ctxOffset) 0 may be used if both $X_0$ and $X_1$ are 0, a context offset 1 may be used when only any one of X0 and X1 is a non-zero value, and a context offset 2 may be used when both $X_0$ and $X_1$ are non-zero values. Meanwhile, when applying BDPCM, 3 may be used as a context offset.

Overview of Block Difference Pulse Code Modulation (BDPCM)

The image encoding apparatus and the image decoding apparatus according to an embodiment may perform differential encoding of a residual signal. For example, the image encoding apparatus may encode the residual signal by subtracting a prediction signal from the residual signal of a current block, and the image decoding apparatus may decode the residual signal by adding the prediction signal to the residual signal of the current block. The image encoding apparatus and the image decoding apparatus according to an embodiment may perform differential encoding of the residual signal by applying BDPCM described below.

BDPCM according to the present disclosure may be performed in a quantized residual domain. The quantized residual domain may include a quantized residual signal (or quantized residual coefficient), and, when applying BDPCM, transform of the quantized residual signal may be skipped. For example, when applying BDPCM, transform of the residual signal may be skipped and quantization may be performed. Alternatively, the quantized residual domain may include quantized transform coefficients.

In an embodiment to which BDPCM applies, the image encoding apparatus may derive a residual block of a current block predicted in an intra prediction mode and quantize the residual block, thereby deriving a residual block. When a differential encoding mode of the residual signal is performed with respect to the current block, the image encoding apparatus may perform differential encoding with respect to the residual block to derive a modified residual block. In addition, the image encoding apparatus may encode differential encoding mode information specifying the differential encoding mode of the residual signal and the modified residual block, thereby generating a bitstream.

More specifically, when BDPCM applies to the current block, a predicted block (prediction block) including predicted samples of the current block may be generated by intra prediction. In this case, an intra prediction mode for performing intra prediction may be signaled through a bitstream and may be derived based on a prediction direction of BDPCM described below. In addition, in this case, the intra prediction mode may be determined to be one of a vertical prediction direction mode or a horizontal prediction direction mode. For example, when the prediction direction of BDPCM is a horizontal direction, the intra prediction mode may be determined to be a horizontal prediction direction mode, and the prediction block of the current block may be generated by intra prediction of the horizontal direction. Alternatively, when the prediction direction of BDPCM is a vertical direction, the intra prediction mode may be determined to be a vertical prediction direction mode, and the prediction block of the current block may be generated by intra prediction of the vertical direction. When applying intra prediction of the horizontal direction, a value of a pixel adjacent to the left of the current block may be determined to be a prediction sample value of samples included in a corresponding row of the current block. When applying intra prediction of the vertical direction, a value of a pixel adjacent to the top of the current block may be determined to be a prediction sample value of samples included in a corresponding column of the current block. When applying BDPCM to the current block, a method of generating the prediction block of the current block may be equally performed in an image encoding apparatus and an image decoding apparatus.

When applying BDPCM to the current block, the image encoding apparatus may generate a residual block including residual samples of the current block, by subtracting the prediction sample from the current block. The image encoding apparatus may quantize the residual block and then encode a difference (or delta) between a quantized residual sample and a predictor of the quantized residual sample. The image decoding apparatus may generate the quantized residual block of the current block, by obtaining the quantized residual sample of the current block based on the predictor and the difference reconstructed from a bitstream. Thereafter, the image decoding apparatus may dequantize the quantized residual block and then add it to the prediction block, thereby reconstructing the current block.

Figures 32, 33:
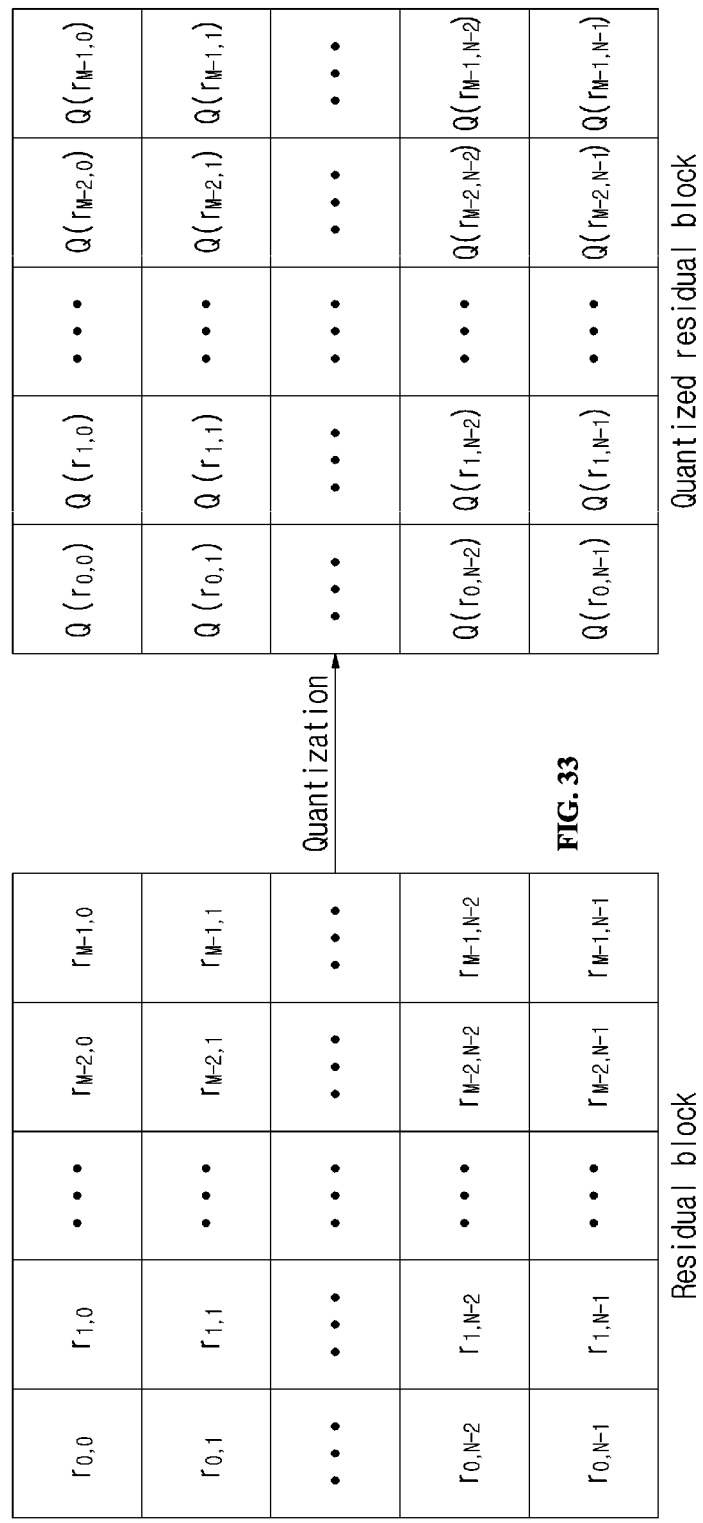
FIG. 32 is a view illustrating a method of encoding a residual sample of BDPCM according to an example.
FIG. 33 is a view illustrating a modified quantized residual block generated by performing BDPCM according to an embodiment.

FIG. 32 is a view illustrating a method of encoding a residual sample of BDPCM according to the present disclosure. The residual block of FIG. 32 may be generated by subtracting a prediction block from a current block in an image encoding apparatus. The quantized residual block of FIG. 32 may be generated by quantizing the residual block by the image encoding apparatus. In FIG. 32, $r_{i,j}$ specifies a value of a residual sample of the (i, j) coordinates in a current block. When the size of the current block is M×N, a value i may be from 0 to M−1, inclusive. In addition, a value j may be from 0 to N−1, inclusive. For example, residual may represent a difference between an original block and a prediction block. For example, $r_{i,j}$ may be derived by subtracting the value of the prediction sample from the value of an original sample of the (i, j) coordinates in the current block. For example, $r_{i,j}$ may be prediction residual after performing horizontal intra prediction copying a value of a left neighboring pixel along a line traversing a prediction block or vertical intra prediction copying a top neighboring line to an individual line of a prediction block, which use a unfiltered sample from a top or left boundary sample.

In FIG. 32, $Q(r_{i,j})$ specifies a value of a quantized residual sample of (i, j) coordinates within a current block. For example, $Q(r_{i,j})$ may specify a quantized value of $r_{i,j}$.

Prediction of BDPCM is performed with respect to quantized residual samples of FIG. 32 and a modified quantized residual block R' having a size of M×N including modified quantized residual samples r' may be generated.

When the prediction direction of BDPCM is a horizontal direction, the value $r'_{i,j}$ of the modified quantized residual sample of the (i, j) coordinates in the current block may be calculated as shown in the following equation.

$$r'_{i,j} = \begin{cases} Q(r_{i,j}), & i = 0, 0 \le j \le (N-1) \\ Q(r_{i,j}) - Q(r_{(i-1),j}), & 1 \le i \le (M-1), 0 \le j \le (N-1) \end{cases} \quad \text{[Equation 15]}$$

As shown in Equation 15 above, when the prediction direction of BDPCM is a horizontal direction, the value $r'_{0,j}$ of the (0, j) coordinates is assigned a value $Q(r_{0,j})$ of the quantized residual sample without change. The value $r'_{i,j}$ of the other (i, j) coordinates is derived as a difference between the value $Q(r_{i,j})$ of the quantized residual sample of the (i, j) coordinates and the value $Q(r_{i-1,j})$ of the quantized residual sample of the (i−1, j) coordinates. That is, instead of encoding the value $Q(r_{i,j})$ of the quantized residual sample of the (i, j) coordinates, a difference calculated using the value $Q(r_{i-1,j})$ of the quantized residual sample of the (i−1, j) coordinates as prediction value is derived as the modified quantized residual sample value $r'_{i,j}$ and then the value $r'_{i,j}$ is encoded.

When the prediction direction of BDPCM is a vertical direction, the value $r'_{0,j}$ of the modified quantized residual sample of the (0, j) coordinates in the current block may be calculated as shown in the following equation.

$$r_{i,j} = \begin{cases} Q(r_{i,j}), & 0 \le i \le (M-1), j = 0 \\ Q(r_{i,j}) - Q(r_{i,(j-1)}), & 0 \le i \le (M-1), 1 \le j \le (N-1) \end{cases} \quad \text{[Equation 16]}$$

As shown in Equation 16 above, when the prediction direction of BDPCM is a vertical direction, the value $r'_{0,j}$ of the (i, 0) coordinates is assigned a value $Q(r_{i,0})$ of the quantized residual sample without change. The value $r'_{i,j}$ of the other (i, j) coordinates is derived as a difference between the value $Q(r_{i,j})$ of the quantized residual sample of the (i, j) coordinates and the value $Q(r_{i,\ j-1})$ of the quantized residual sample of the (i, j−1) coordinates. That is, instead of encoding the value $Q(r_{i,\ j})$ of the quantized residual sample of the (i, j) coordinates, a difference calculated using the value $Q(r_{i,j-1})$ of the quantized residual sample of the (i, j−1) coordinates as prediction value is derived as the modified quantized residual sample value $r'_{i,\ j}$ and then the value $r'_{i,\ j}$ is encoded.

As described above, a process of modifying a current quantized residual sample value using an adjacent quantized residual sample value as a prediction value may be referred to as BDPCM prediction.

Finally, the image encoding apparatus may encode and transmit a modified quantized residual block including the modified quantized residual samples to an image decoding apparatus. In this case, as described above, transform of the modified quantized residual block is not performed.

FIG. 33 is a view illustrating a modified quantized residual block generated by performing BDPCM according to an embodiment.

In FIG. 33, horizontal BDPCM specifies a modified quantized residual block generated according to Equation 15 above, when the prediction direction of BDPCM is a horizontal direction. In addition, vertical BDPCM specifies a modified quantized residual block generated according to Equation 16 above, when the prediction direction of BDPCM is a vertical direction.

Figure 34:
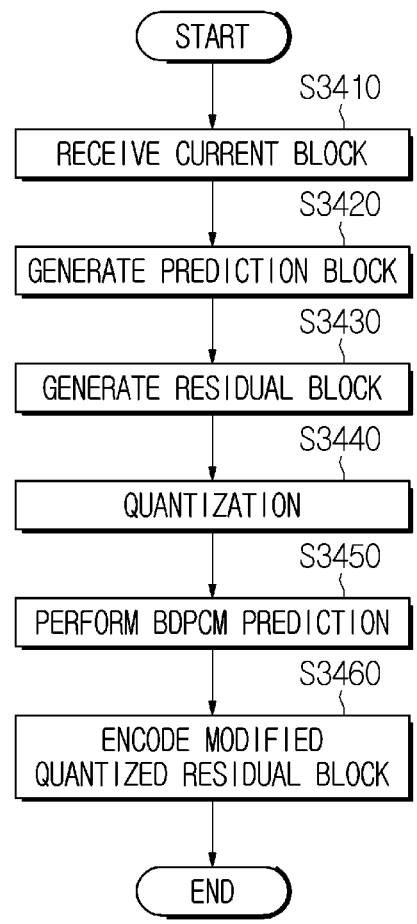
FIG. 34 is a flowchart illustrating a procedure for encoding a current block by applying BDPCM in an image encoding apparatus according to an embodiment.

FIG. 34 is a flowchart illustrating a procedure for encoding a current block by applying BDPCM in an image encoding apparatus.

First, when a current block which is a block to be encoded is input (S3410), prediction may be performed with respect to the current block to generate a prediction block (S3420). The prediction block of step S3420 may be an intra-predicted block, and the intra prediction mode may be determined as described above. A residual block of the current block may be generated based on the prediction block generated in step S3420 (S3430). For example, the image encoding apparatus may generate a residual value (a value of a residual sample) by subtracting the prediction block (a value of a predicted sample) from the current block (a value of an original sample). For example, by performing step S3430, the residual block of FIG. 32 may be generated. Quantization may be performed with respect to the residual block generated in step S3430 (S3440), a quantized residual block may be generated, and BDPCM prediction may be performed with respect to the quantized residual block (S3450). The quantized residual block generated as a result of performing step S3440 may be the quantized residual block of FIG. 32, and the modified quantized residual block of FIG. 33 may be generated according to the prediction direction as a result of BDPCM prediction of step S3450. BDPCM prediction of step S3450 was described with reference to FIGS. 32 to 33 and a detailed description thereof will be omitted. Thereafter, the image encoding apparatus may generate a bitstream by encoding the modified quantized residual block (S3460). In this case, transform for the modified quantized residual block may be skipped.

BDPCM operation in the image encoding apparatus described with reference to FIGS. 32 to 34 may be reversely performed in the image decoding apparatus.

Figures 35, 36, 37:
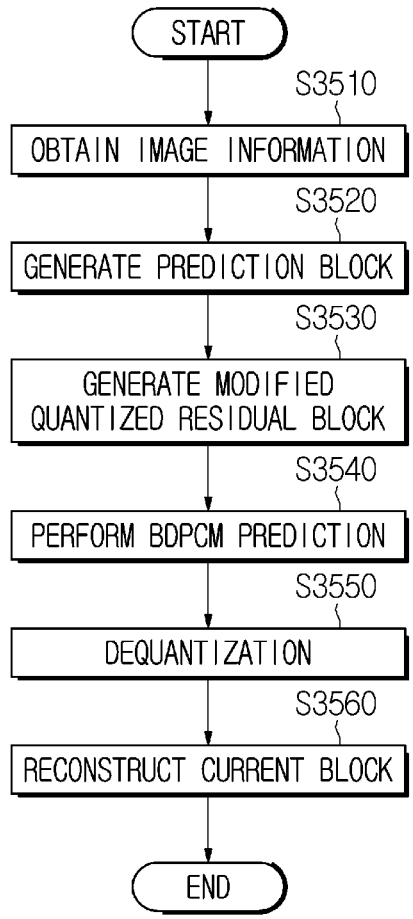

FIG. 35 is a flowchart illustrating a procedure for reconstructing a current block by applying BDPCM in an image decoding apparatus.

The image decoding apparatus may obtain information (image information) necessary to reconstruct a current block from a bitstream (S3510). The information necessary to reconstruct the current block may include information on prediction of the current block (prediction information) and information on a residual of the current block (residual information). The image decoding apparatus may perform prediction with respect to the current block based on the information on the current block and generate a prediction block (S3520). Prediction of the current block may be intra prediction and a detailed description thereof is the same as that described with reference to FIG. 34. In FIG. 35, step S3520 of generating the prediction block of the current block is shown as being performed prior to steps S3530 to S3550 of generating a residual block of the current block. However, the present disclosure is not limited thereto and the prediction block of the current block may be generated after the residual block of the current block is generated. Alternatively, the residual block of the current block and the prediction block of the current block may be simultaneously generated.

The image decoding apparatus may generate the residual block of the current block by parsing the residual information of the current block from the bitstream (S3530). The residual block generated in step S3530 may be the modified quantized residual block shown in FIG. 33.

The image decoding apparatus may perform BDPCM prediction with respect to the modified quantized residual block of FIG. 33 (S3540) to generate the quantized residual block of FIG. 32. BDPCM prediction of step S3540 is a procedure for generating the quantized residual block of FIG. 32 from the modified quantized residual block of FIG. 32 and thus may correspond to the reverse process of step S3450 performed by the image encoding apparatus. For example, when differential encoding mode information (e.g., bdpcm_flag) obtained from the bitstream specifies a differential encoding mode in which differential encoding of the residual coefficient is performed as BDPCM applies, the image decoding apparatus may perform differential encoding with respect to the residual block to derive a modified residual block. The image decoding apparatus may modify at least one residual coefficient to be modified among residual coefficients in the residual block, using the residual coefficient to be modified and a prediction residual coefficient. The prediction residual coefficient may be determined based on a prediction direction specified by differential encoding direction (e.g., bdpcm_dir_flag) obtained from the bitstream. The differential encoding direction information may specify any one of a vertical direction or a horizontal direction. The image decoding apparatus may assign a value obtained by adding the residual coefficient to be modified and the prediction residual coefficient to the position of the residual coefficient to be modified. Here, the prediction residual coefficient may be an adjacent coefficient immediately before the residual coefficient to be modified in the order according to the prediction direction.

BDPCM prediction of step S3540 performed by the image decoding apparatus will be described in greater detail below. The decoding apparatus may calculate a quantized residual sample $Q(r_{i,\ j})$ by inversely performing calculation performed by the encoding apparatus. For example, when the prediction direction of BDPCM is a horizontal direction, the image decoding apparatus may generate a quantized residual block from a modified quantized residual block using Equation 9.

$$Q(r_{i,j}) = \Sigma_{k=0}^{i} r'_{k,j}, 0 \leq i \leq (M-1), 0 \leq j \leq (N-1) \quad \text{[Equation 17]}$$

As defined in Equation 17, the value $Q(r_{i,j})$ of the quantized residual value of the (i, j) coordinates may be calculated by summing the values of the modified quantized residual samples from the (0, j) coordinates to the (i, j) coordinates.

Alternatively, instead of Equation 17 above, the value $Q(r_{i,j})$ of the quantized residual value of the (i, j) coordinates may be calculated using Equation 18.

$$Q(r_{i,j}) = \begin{cases} r'_{i,j}, & i = 0, 0 \le j \le (N-1) \\ r'_{i,j} + Q(r_{(i-1),j}), & 1 \le i \le (M-1), 0 \le j \le (N-1) \end{cases} \quad \text{[Equation 18]}$$

Equation 18 above is the reverse process corresponding to Equation 15. According to Equation 18 above, the value $Q(r_{0,j})$ of the quantized residual sample of the (0, j) coordinates is derived as a value $r'_{0,j}$ of the modified quantized residual sample of the (0, j) coordinates. $Q(r_{i,j})$ of the other (i, j) coordinates is derived as a sum of the value $r'_{i,j}$ of the modified quantized residual sample of the (i, j) and the value $Q(r_{i-1,j})$ of the quantized residual sample of the (i−1, j) coordinates. That is, the quantized residual sample value $Q(r_{i,j})$ may be derived by summing a difference $r'_{i,j}$ using the value $Q(r_{i-1,j})$ of the quantized residual sample of the (i−1, j) coordinates as a prediction value.

When the prediction direction of BDPCM is a vertical direction, the image decoding apparatus may generate a quantized residual block from a modified quantized residual block using Equation 19.

$$Q(r_{i,j}) = \Sigma_{k=0}^{j} r'_{i,k}, 0 \le i \le (M-1), 0 \le j \le (N-1) \quad \text{[Equation 19]}$$

As defined in Equation 19, the value $Q(r_{i,j})$ of the quantized residual value of the (i, j) coordinates may be calculated by summing the values of the modified quantized residual samples from the (i, 0) coordinates to the (i, j) coordinates.

Alternatively, instead of Equation 19 above, the value $Q(r_{i,j})$ of the quantized residual value of the (i, j) coordinates may be calculated using Equation 20.

$$Q(r_{i,j}) = \begin{cases} r'_{i,j}, & 0 \le i \le (M-1), j = 0 \\ r'_{i,j} + Q(r_{i,(j-1)}), & 0 \le i \le (M-1), 1 \le j \le (N-1) \end{cases} \quad \text{[Equation 20]}$$

Equation 20 above is the reverse process corresponding to Equation 16. According to Equation 20 above, the value $Q(r_{i,0})$ of the quantized residual sample of the (i, 0) coordinates is derived as a value $r'_{0,j}$ of the modified quantized residual sample of the (i, 0) coordinates. $Q(r_{i,j})$ of the other (i, j) coordinates is derived as a sum of the value $r'_{i,j}$ of the modified quantized residual sample of the (i, j) and the value $Q(r_{i,j-1})$ of the quantized residual sample of the (i, j−1) coordinates. That is, the quantized residual sample value $Q(r_{i,j})$ may be derived by summing a difference $r'_{i,j}$ using the value $Q(r_{i,j-1})$ of the quantized residual sample of the (i, j−1) coordinates as a prediction value.

When the quantized residual block composed of the quantized residual samples is generated by performing step S3540 by the above-described method, the image decoding apparatus may generate the residual block of the current block, by performing dequantization with respect to the quantized residual block (S3550). When applying BDPCM, as described above, transform for the current block is skipped and thus inverse transform of the dequantized residual block may be skipped.

Thereafter, the image decoding apparatus may reconstruct the current block based on the prediction block generated in step S3520 and the residual block generated in step S3550 (S3560). For example, the image decoding apparatus may reconstruct the current block (the value of the reconstructed block) by adding the prediction block (the value of the predicted sample) and the residual block (the value of the residual sample). For example, a reconstructed sample value may be generated by adding a dequantized quantized sample $Q^{-1}(Q(r_{i,j}))$ to an intra block prediction value. Differential encoding information specifying whether BDPCM applies to the current block may be signaled through a bitstream. In addition, when BDPCM applies to the current block, differential encoding information specifying a prediction direction of BDPCM may be signaled through a bitstream. When BDPCM does not apply to the current block, the differential encoding information may not be signaled.

FIGS. 36 to 38 are views schematically illustrating syntax for signaling information on BDPCM.

FIG. 36 is a view illustrating syntax of a sequence parameter set according to an embodiment for signaling BDPCM information. In an embodiment, all SPS RBSPs which are included in at least one access unit (AU) having a temporal ID TemporalId of 0 or are provided through an external unit may be set to be used before being referenced in a decoding process. In addition, an SPS NAL unit including an SPS RBSP may be set to have the same nuh_layer_id as nuh_layer_id of a PPS NAL unit referencing it. In a CVS, all SPS NAL units having a specific sps_seq_parameter_set_id value may be set to have the same content. In the seq_parameter_set_rbsp( ) syntax of FIG. 36, sps_transform_skip_enable_flag described above and sps_bdpcm_enabled_flag described below are disclosed.

A syntax element sps_bdpcm_enabled_flag may specify whether intra_bdpcm_flag is provided by CU syntax for an intra coding unit. For example, a first value (e.g., 0) of sps_bdpcm_enabled_flag may specify that intra_bdpcm_flag is not provided by CU syntax for the intra coding unit. A second value (e.g., 1) of sps_bdpcm_enabled_flag may specify that intra_bdpcm_flag may be provided by CU syntax for the intra coding unit. Meanwhile, when sps_bdpcm_enabled_flag is not provided, the value of sps_bdpcm_enabled_flag may be set to a first value (e.g., 0).

FIG. 37 is a view illustrating an embodiment of syntax for signaling whether to apply a constraint on BDPCM. In an embodiment, a predetermined constraint condition in an encoding/decoding process may be signaled using general_constraint_info( ) syntax. Using the syntax of FIG. 37, a syntax element no_bdpcm_constraint_flag specifying that the value of sps_bdpcm_enabled_flag described above is set to 0 may be signaled. For example, a first value (e.g., 0) of no_bdpcm_constraint_flag may specify that such a constraint does not apply. When the value of no_bdpcm_constraint_flag is a second value (e.g., 1), the value of sps_bdpcm_enabled_flag may be forced to be a first value (e.g., 0).

FIG. 38 is a view illustrating an embodiment of coding unit( ) syntax for signaling information on BDPCM for a coding unit. As shown in FIG. 38, using the coding_unit( ) syntax, syntax elements intra_bdpcm_flag and intra_bdpcm_dir_flag may be signaled. The syntax element intra_bdpcm_flag may specify whether BDPCM applies to a current luma coding block located at (x0, y0).

For example, a first value (e.g., 0) of intra_bdpcm_flag may specify that BDPCM does not apply to the current luma coding block. A second value (e.g., 1) of intra_bdpcm_flag may specify that BDPCM applies to the current luma coding block. intra_bdpcm_flag may specify whether the intra luma prediction mode is performed by intra_bdpcm_dir_flag described below along with whether transform is skipped, by specifying that BDPCM applies.

Meanwhile, the value of the above-described variable BdpcmFlag[x][y] may be set to a value of intra_bdpcm_flag, for x=x0 . . . x0+cbWidth−1 and y=y0 . . . y0+cbHeight−1.

A syntax element intra_bdpcm_dir_flag may specify a prediction direction of BDPCM. For example, a first value (e.g., 0) of intra_bdpcm_dir_flag may specify that the prediction direction of BDPCM is a horizontal direction. A second value (e.g., 1) of intra_bdpcm_dir_flag may specify that the prediction direction of BDPCM is a vertical direction.

Meanwhile, the value of a variable BdpcmDir[x][y] may be set to a value of intra_bdpcm_dir_flag, for x=x0 . . . x0+cbWidth−1 and y=y0 . . . y0+cbHeight−1.

Determination of Residual Coding Pass for Coding Block to which BDPCM Applies

Hereinafter, residual coding performed by the above-described encoding apparatus and decoding apparatus will be described in greater detail. In the present embodiment, a BDPCM residual coding method for lossless coding is disclosed. As described above, when a current CU is a block coded in BDPCM and transform skip residual coding is used, a value of transform_skip_flag may be derived as a second value (e.g., 1). However, even in this case, when the transform skip mode and the BDPCM mode are not supported for a chroma block, regular residual coding may apply to the chroma block of the current CU instead of transform skip residual coding.

For example, the encoding apparatus and the decoding apparatus may set the value of transform_skip_flag to a second value (e.g., 1) when the current CU is encoded in the BDPCM mode. Accordingly, residuals for performing transform skip residual coding on the luma component block of the current CU are signaled through a bitstream. However, when a skip mode and/or BDPCM mode are not supported for a chroma component block, encoding using transform skip residual coding is not performed on the chroma component block, but encoding using regular residual coding is performed. Accordingly, different residual coding pass may apply to the luma component block and the chroma component block belonging to the same CU, thereby lowering coding rate.

This problem may be solved by applying an integrated residual coding method to the luma component block and the chroma component block. For example, in order to increase a coding rate for a BDPCM block, for a coding block to which BDPCM applies, both the luma component block and the chroma component block may use regular residual coding instead of transform skip residual coding. This processing may help increase in coding efficiency, particularly when a lossless mode applies as described above.

The encoding apparatus needs to signal that regular residual coding is used for residual coding of the luma component block for the coding block, to which BDPCM applies. FIG. 39 is a view illustrating syntax of a TU for signaling a residual coding method selected to residual-code a luma component block. In order to signal whether regular residual coding applies to a coding block to which BDPCM applies, in the syntax of FIG. 39, a condition 3910 for parsing transform_skip_flag was changed compared to the TU syntax of FIG. 28. More specifically, the condition 3910 for parsing transform_skip_flag may further include a syntax element cu_transquant_bypass_flag in order to specify whether a regular residual coding pass applies for residual coding of the corresponding coding block. cu_transquant_bypass_flag may be referred to as a regular residual coding pass enabling flag or a transform skip residual coding pass constraint flag (e.g., ts_residual_coding_disabled_flag) in terms of specifying whether the regular residual coding pass applies to a current coding block.

A first value (e.g., 0) of cu_transquant_bypass_flag may specify that transform skip residual coding may apply for residual coding of the corresponding coding block. A second value (e.g., 1) of cu_transquant_bypass_flag may specify that regular residual coding applies without applying transform skip residual coding for residual coding of the corresponding coding block. Meanwhile, in addition, a first value (e.g., 0) of cu_transquant_bypass_flag may specify that a quantization, transform and in-loop filter process may apply for the corresponding coding block. A second value (e.g., 1) of cu_transquant_bypass_flag may specify that the quantization, transform and in-loop filter process is bypassed for the corresponding coding block.

According to use of cu_transquant_bypass_flag, when BDPCM does not apply to the current coding block and transform skip residual coding may apply for residual coding of the current coding block, the transform_skip_flag syntax element may be obtained from the bitstream. Therefore, when BDPCM applies to the current coding block or regular residual coding applies for residual coding of the current coding block, the transform_skip_flag syntax element may not be obtained from the bitstream.

When transform_skip_flag syntax element is not obtained from the bitstream, derivation of the value of transform_skip_flag may be determined based on the value of cu_transquant_bypass_flag. For example, when the value of BdpcmFlag[x0][y0] is a second value (e.g., 1) and the value of cu_transquant_bypass_flag[x0][y0] is a first value (e.g., 0), the value of transform_skip_flag[x0][y0] may be derived as a second value (e.g., 1). Accordingly, residual coding of the luma component block of the current coding block may be performed according to the transform skip residual coding pass, and, for example, a syntax element therefor may be obtained from the bitstream by residual_ts_coding( ) syntax 3930 according to the syntax of FIG. 39.

Meanwhile, when the value of BdpcmFlag[x0][y0] is a first value (e.g., 0) or the value of cu_transquant_bypass_flag[x0][y0] is a second value (e.g., 1), the value of transform_skip_flag[x0][y0] may be derived as a first value (e.g., 0). Therefore, residual coding of the luma component block of the current coding block may be performed according to the regular residual coding pass instead of the transform skip residual coding pass. For example, a syntax element therefor may be obtained from the bitstream by residual_coding( ) syntax 3920 according to the syntax of FIG. 39.

Meanwhile, as described above, when BDPCM applies to the current coding block, even if the regular residual coding pass is forced as the residual coding pass, transform may not be performed on the corresponding luma component block. A TU syntax therefor is shown in FIG. 40. In the syntax of FIG. 40, a parsing condition 4010 of transform_skip_flag may be determined according to the following equation as described above with reference to FIG. 28, and, only when the following condition is true, a transform_skip_flag syntax element may be obtained from the bitstream.

$$\text{sps\_transform\_skip\_enabled\_flag \&\&!BdpcmFlag} \\ [x0][y0] \text{ \&\& tbWidth} \leq \text{MaxTsSize \&\&} \\ \text{tbHeight} \leq \text{MaxTsSize} \qquad \text{[Equation 21]}$$

Meanwhile, when transform_skip_flag is not parsed from the bitstream, the value of transform_skip_flag may be determined to be a value specifying transform skip when BDPCM applies, and may be determined to be a value specifying that whether to apply transform is determined by another syntax element when BDPCM does not apply. For example, when the value of BdpcmFlag[x0][y0] is a second value (e.g., 1), the value of transform_skip_flag[x0][y0] may be derived as a second value (e.g., 1). Therefore, transform may not apply to the corresponding coding block. In addition, when the value of BdpcmFlag[x0][y0] is a first value (e.g., 0), the value of transform_skip_flag[x0][y0] may be derived as a first value (e.g., 0).

Meanwhile, as shown in FIG. 40, a residual coding pass determination condition 4020 of the luma component block of the current coding block may be determined based on the values of transform_skip_flag[x0][y0] and cu_transquant_bypass_flag[x0][y0]. For example, when the value of transform_skip_flag[x0][y0] is a first value (e.g., 0) or the value of cu_transquant_bypass_flag[x0][y0] is a second value (e.g., 1), the regular residual coding pass may apply to the luma component block of the current coding block, a syntax element for performing the regular residual coding pass may be obtained from the bitstream using residual_coding( ) syntax 4030. Meanwhile, only when the value of transform_skip_flag[x0][y0] is a second value (e.g., 1) and the value of cu_transquant_bypass_flag[x0][y0] is a first value (e.g., 0), the transform skip residual coding pass may apply to the luma component block of the current coding block. For this, a syntax element for performing the transform skip residual coding pass may be obtained from the bitstream using residual_ts_coding( ) syntax 4040.

Encoding and Decoding Method

Figure 41:
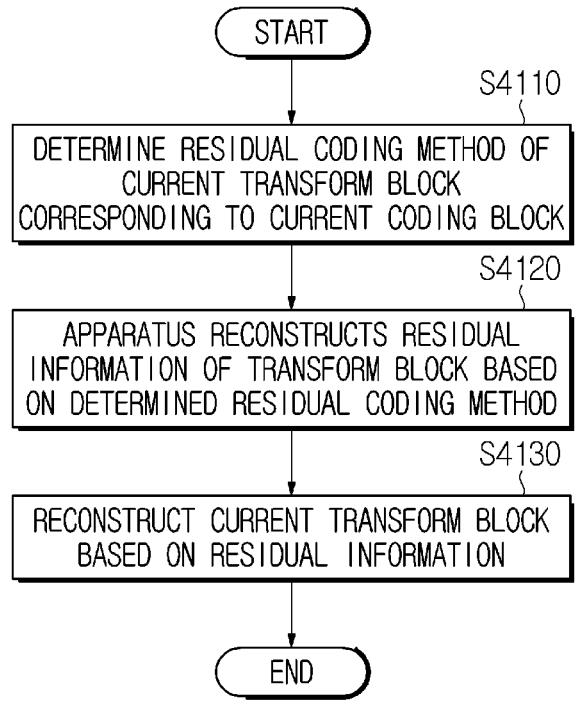
FIG. 41 is a view illustrating an image decoding method according to an embodiment.
Figure 42:
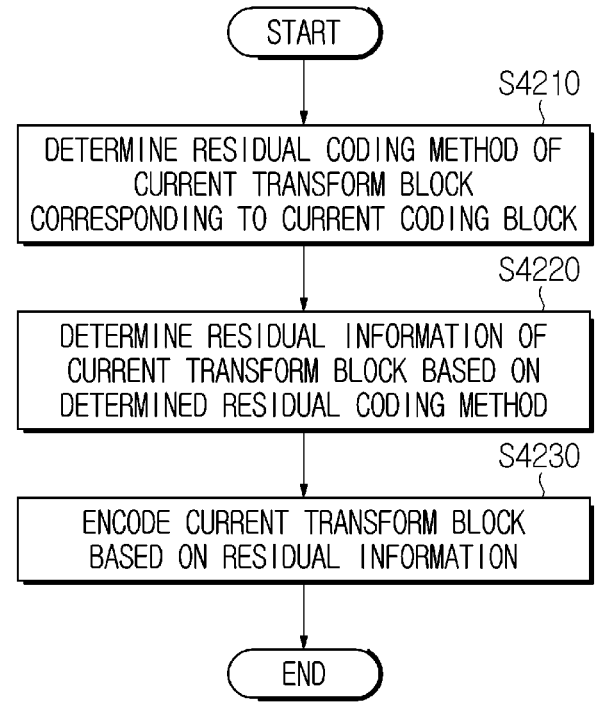
FIG. 42 is a view illustrating an image encoding method according to an embodiment.

Hereinafter, an image encoding method and decoding method performed by an image encoding apparatus and an image decoding apparatus will be described with reference to FIGS. 41 and 42.

First, operation of the decoding apparatus will be described. The image decoding apparatus according to an embodiment may include a memory and a processor, and the decoding apparatus may perform decoding by operation of the processor. For example, as shown in FIG. 41, the decoding apparatus may determine a residual coding method of a current transform block corresponding to a current coding block (S4110). Next, the decoding apparatus may reconstruct residual information of the transform block based on the determined residual coding method (S4120). Next, the decoding apparatus may reconstruct the current transform block based on the residual information (S4130). The decoding apparatus may determine whether transform skip residual coding is able to be performed on the current transform block using the residual coding method of the transform block, when block based delta pulse code modulation (BDPCM) applies to the current coding block.

For example, as described above, based on a flag (e.g., BdpcmFlag) specifying whether BDPCM applies to the current coding block and a flag (e.g., cu_transquant_bypass_flag) specifying whether regular residual coding applies to residual coding of the current coding block, the decoding apparatus may determine a residual coding pass of the current coding block to be any one residual coding pass of a regular residual coding pass or a transform skip residual coding pass.

More specifically, the decoding apparatus may determine the residual coding pass, by determining a value of a transform skip flag (e.g., transform_skip_flag) specifying whether transform applies or not in a decoding process of the current coding block, based on BdpcmFlag and cu_transquant_bypass_flag. Here, whether BDPCM applies to the current coding block may be signaled by a first flag (e.g., intra_bdpcm_flag), and whether transform skip residual coding is able to be performed on the current transform block may be signaled by a second flag (e.g., cu_transquant_bypass_flag).

For example, when the first flag specifies that BDPCM does not apply to the current coding block, the residual coding method of the transform block may be determined based on whether transform of the current transform block is skipped. Here, whether transform of the current transform block is skipped may be signaled by a transform skip flag (e.g., transform_skip_flag). In addition, when the second flag specifies that transform skip residual coding is not able to be performed on the current transform block, the residual coding method of the current transform block may be determined to be a regular residual coding method.

For example, when the first flag specifies that BDPCM applies to the current coding block and the second flag specifies that transform skip residual coding is able to be performed on the current transform block, the residual coding method of the current transform block may be determined to be a transform skip residual coding method. Alternatively, when the first flag specifies that BDPCM applies to the current coding block and the second flag specifies that transform skip residual coding is not able to be performed on the current transform block, the residual coding method of the current transform block may be determined to be a regular residual coding method.

Alternatively, when the first flag specifies that BDPCM does not apply to the current coding block and transform of the current transform block is not skipped, the residual coding method of the current transform block may be determined to be a regular residual coding method. Alternatively, when the first flag specifies that BDPCM does not apply to the current coding block, transform of the current transform block is skipped and the second flag specifies that transform skip residual coding is not able to be performed on the current transform block, the residual coding method of the current transform block may be determined to be a regular residual coding method.

Meanwhile, as described above, the residual coding method may be determined based on a transform skip flag specifying whether transform of the current transform block is skipped, and the transform skip flag may be obtained from the bitstream based on whether BDPCM applies to the current coding block. When the transform skip flag is not obtained from the bitstream, the value of the transform skip flag may be derived based on whether BDPCM applies to the current coding block.

When the value of the transform skip flag is derived, the value of the transform skip flag may be derived by further considering whether transform skip residual coding is able to be performed on the current transform block. For example, when the value of the transform skip flag is derived, BDPCM applies to the current coding block, and when transform skip residual coding is not able to be performed on the current transform block, the value of the transform skip flag may be determined to be a value specifying that transform of the current transform block is not skipped. Meanwhile, when the value of the transform skip flag is derived, if BDPCM does not apply to the current coding block or transform skip residual coding is able to be performed on the current transform block, the value of the transform skip flag may be determined to be a value specifying that transform of the current transform block is skipped.

Next, operation of the encoding apparatus will be described. An image encoding apparatus according to an embodiment may include a memory and a processor, and the encoding apparatus may perform encoding by operation of the processor in a manner corresponding to decoding of the decoding apparatus. For example, as shown in FIG. 42, the encoding apparatus may determine a residual coding method of a current transform block corresponding to a current coding block (S4210). Next, the encoding apparatus may determine residual information of the current transform block based on the residual coding method (S4220). Next, the encoding apparatus may encode the current transform block based on the residual information (S4230). Here, when block based delta pulse code modulation (BDPCM) applies to the current coding block, the encoding apparatus may determine the residual coding method of the current transform block based on whether transform skip residual coding is able to be performed on a transform block.

For example, as described above, the encoding apparatus may determine the residual coding pass of the current coding block to be any one residual coding pass of a regular residual coding pass and a transform skip residual coding pass. In addition, the encoding apparatus may determine a value of a flag (e.g., BdpcmFlag) specifying whether BDPCM applies to the current coding block and a value of a flag (e.g., cu_transquant_bypass_flag) specifying whether regular residual coding applies to residual coding of the current coding block and encode them to generate a bitstream, in order to signal residual information according to the determined residual coding pass.

For example, the encoding apparatus may encode the value of a transform skip flag (e.g. transform_skip_flag) specifying whether to apply transform or not in the decoding process of the current coding block, in order to signal the residual coding pass applying to the current coding block. Encoding of the transform skip flag may be performed based on BdpcmFlag and cu_transquant_bypass_flag as described above. Here, whether BDPCM applies to the current coding block may be signaled by a first flag (e.g., intra_bdpcm_flag), and whether transform skip residual coding is able to be performed on the current transform block may be signaled by a second flag (e.g., cu_transquant_bypass_flag).

Application Embodiment

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 43:
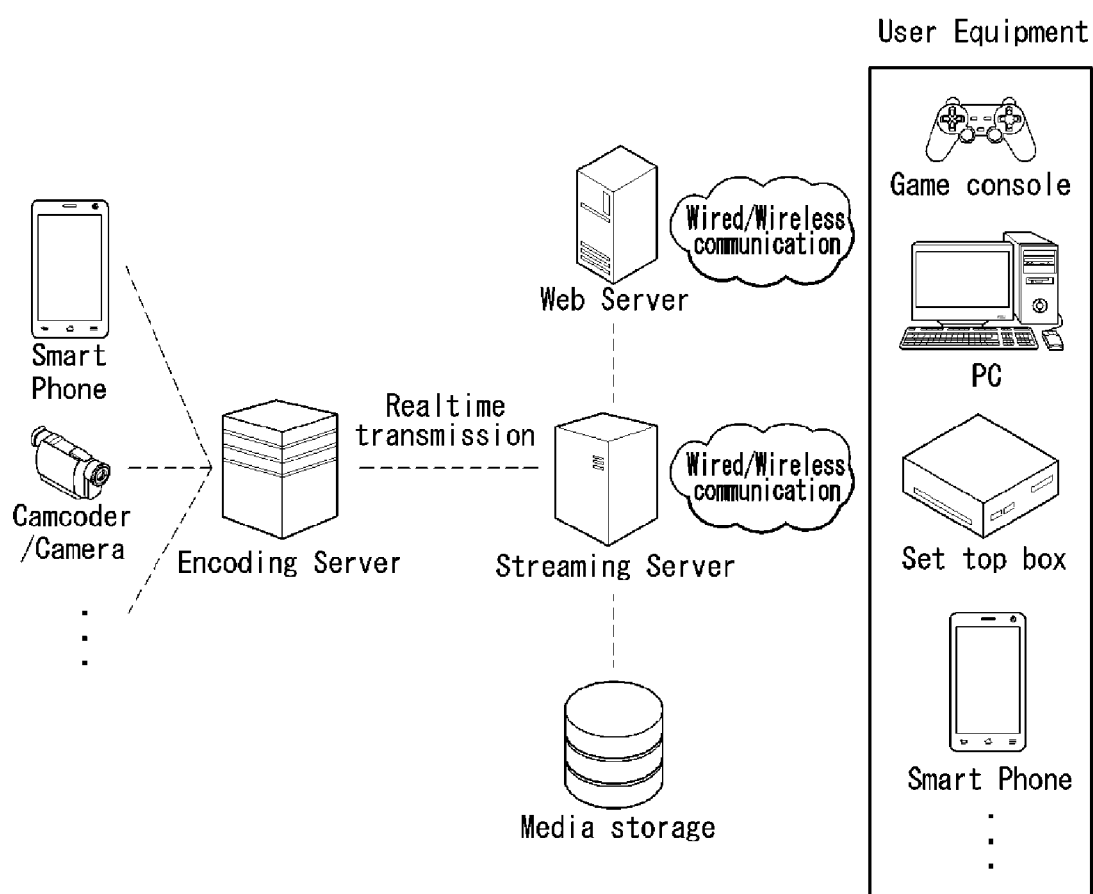
FIG. 43 is a view showing a content streaming system, to which an embodiment of the present disclosure is applicable.

FIG. 43 is a view showing a content streaming system, to which an embodiment of the present disclosure is applicable.

As shown in FIG. 43, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
   determining a residual coding method of a current transform block corresponding to a current coding block;
   reconstructing residual information of the transform block based on the determined residual coding method; and
   reconstructing the current transform block based on the residual information,
   wherein the residual coding method is determined based on a transform skip flag specifying whether transform of the current transform block is skipped,
   wherein the transform skip flag is obtained from a bitstream based on BDPCM being not applied to the current coding block and transform skip residual coding being not able to be performed on the current coding block,
   wherein, based on the transform skip flag being not obtained from the bitstream, a value of the transform skip flag is derived as a first value specifying that transform of the current transform block is skipped based on both BDPCM being applied to the current coding block and transform skip residual coding being able to be performed on the current coding block, and
   wherein, based on the transform skip flag being not obtained from the bitstream, a value of the transform skip flag is derived as a second value specifying that transform of the current transform block is not skipped based on BDPCM being not applied to the current coding block or transform skip residual coding being not able to be performed on the current coding block.

2. The image decoding method of claim 1,
   wherein whether BDPCM is applied to the current coding block is signaled by a first flag, and
   wherein whether transform skip residual coding is able to be performed on the current coding block is signaled by a second flag.

3. The image decoding method of claim 2,
   wherein, based on the first flag specifying that BDPCM is not applied to the current coding block, the residual coding method of the transform block is determined based on whether transform of the current coding block is skipped, and
   wherein whether transform of the current transform block is skipped is signaled by a transform skip flag.

4. The image decoding method of claim 2, wherein, based on the second flag specifying that transform skip residual coding is not able to be performed on the current coding block, the residual coding method of the current transform block is determined to be a regular residual coding method.

5. The image decoding method of claim 2, wherein, based on the first flag specifying that BDPCM is applied to the current coding block and the second flag specifying that transform skip residual coding is able to be performed on the current coding block, the residual coding method of the current transform block is determined to be a transform skip residual coding method.

6. The image decoding method of claim 2, wherein, based on the first flag specifying that BDPCM is applied to the current coding block and the second flag specifying that transform skip residual coding is not able to be performed on the current coding block, the residual coding method of the current transform block is determined to be a regular residual coding method.

7. The image decoding method of claim 2, wherein, based on the first flag specifying that BDPCM is not applied to the current coding block and transform of the current transform block being not skipped, the residual coding method of the current transform block is determined to be a regular residual coding method.

8. The image decoding method of claim 2, wherein, based on the first flag specifying that BDPCM is not applied to the current coding block, transform of the current transform block being skipped and the second flag specifying that transform skip residual coding is not able to be performed on the current coding block, the residual coding method of the current transform block is determined to be a regular residual coding method.

9. An image decoding apparatus comprising:
   a memory; and
   at least one processor,
   wherein the at least one processor is configured to:
   determine a residual coding method of a current transform block corresponding to a current coding block;
   reconstruct residual information of the current transform block based on the determined residual coding method; and
   reconstruct the current transform block based on the residual information,
   wherein the residual coding method is determined based on a transform skip flag specifying whether transform of the current transform block is skipped,
   wherein the transform skip flag is obtained from a bitstream based on BDPCM being applied to the current coding block and transform skip residual coding being not able to be performed on the current coding block,
   wherein, based on the transform skip flag being not obtained from the bitstream, a value of the transform skip flag is derived as a first value specifying that transform of the current transform block is skipped based on both BDPCM being applied to the current coding block and transform skip residual coding being able to be performed on the current coding block, and
   wherein, based on the transform skip flag being not obtained from the bitstream, a value of the transform skip flag is derived as a second value specifying that transform of the current transform block is not skipped based on BDPCM being not applied to the current coding block or transform skip residual coding being not able to be performed on the current coding block.

10. An image encoding method performed by an image encoding apparatus, the image encoding method comprising:
- determining a residual coding method of a current transform block corresponding to a current coding block;
- determining residual information of the current transform block based on the determined residual coding method; and
- encoding the current transform block based on the residual information,
- wherein the residual coding method is determined based on whether transform of the current transform block is skipped, whether transform of the current transform block being encoded into a bitstream using a transform skip flag,
- wherein the transform skip flag is encoded into the bitstream based on BDPCM being applied to the current coding block and transform skip residual coding being not able to be performed on the current coding block,
- wherein, based on the transform skip flag being not encoded into the bitstream, a value of the transform skip flag is derived as a first value specifying that transform of the current transform block is skipped based on both BDPCM being applied to the current coding block and transform skip residual coding being able to be performed on the current coding block, and
- wherein, based on the transform skip flag being not encoded into the bitstream, a value of the transform skip flag is derived as a second value specifying that transform of the current transform block is not skipped based on BDPCM being not applied to the current coding block or transform skip residual coding being not able to be performed on the current coding block.

11. A method of transmitting a bitstream generated by the image encoding method of claim 10.

* * * * *